(12) United States Patent
Skarin

(10) Patent No.: US 12,685,617 B2
(45) Date of Patent: *\*Jul. 21, 2026*

(54) ORTHODONTIC APPLIANCE AND METHOD FOR MOVING TEETH

(71) Applicant: Skarin Orthodontics, Naperville, IL (US)

(72) Inventor: David A. Skarin, Winfield, IL (US)

(73) Assignee: Skarin Orthodontics, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,429

(22) Filed: Jul. 1, 2022

(65) Prior Publication Data

US 2022/0331067 A1 Oct. 20, 2022

Related U.S. Application Data

(63) Continuation of application No. 17/069,089, filed on Oct. 13, 2020, now Pat. No. 11,376,103, which is a continuation of application No. 16/406,269, filed on May 8, 2019, now Pat. No. 10,799,323.

(60) Provisional application No. 62/670,406, filed on May 11, 2018.

(51) Int. Cl.
  *A61C 7/14* (2006.01)
  *A61C 7/20* (2006.01)
(52) U.S. Cl.
  CPC .............. *A61C 7/141* (2013.01); *A61C 7/20* (2013.01)

(58) Field of Classification Search
  CPC .. A61C 7/141; A61C 7/20; A61C 7/12; A61C 7/00; A61C 7/28
  See application file for complete search history.

(56) References Cited

U.S. PATENT DOCUMENTS

| | | | |
|---|---|---|---|
| 2,558,475 A | 6/1951 | Broussard | |
| 3,193,930 A | 7/1965 | Bien | |
| 2005/0123876 A1 | 6/2005 | Shirasuka | |
| 2011/0014583 A1 | 1/2011 | Romano et al. | |
| 2012/0064476 A1 | 3/2012 | Sabilla | |
| 2014/0212828 A1* | 7/2014 | Falcone ................... | A61C 7/34 |
| | | | 433/10 |
| 2015/0238281 A1 | 8/2015 | Alauddin et al. | |
| 2017/0172707 A1 | 6/2017 | Damon et al. | |

OTHER PUBLICATIONS

Int'l Search Report and Written Opinion Appln No. PCT/US2019/031471 mailed Sep. 16, 2019.
Int'l Preliminary Report on Patentability Appln No. PCT/US2019/031471 mailed Nov. 26, 2020.

\* cited by examiner

*Primary Examiner* — Nicholas D Lucchesi
(74) *Attorney, Agent, or Firm* — McAndrews, Held & Malloy, Ltd.

(57) ABSTRACT

Systems and methods for moving a tooth using a light, continuous force are disclosed. In examples, a bracket has a surface which is mounted to a tooth, and a pair of wings defining a slot having oppositely disposed upper and lower surfaces that converge at an apex. A wire runs through the slot at a distance from the apex. And a tensioning device presses the wire against a surface of the slot, the system is configured so that the wire gradually moves toward the apex of the slot.

16 Claims, 16 Drawing Sheets

Fig. 14
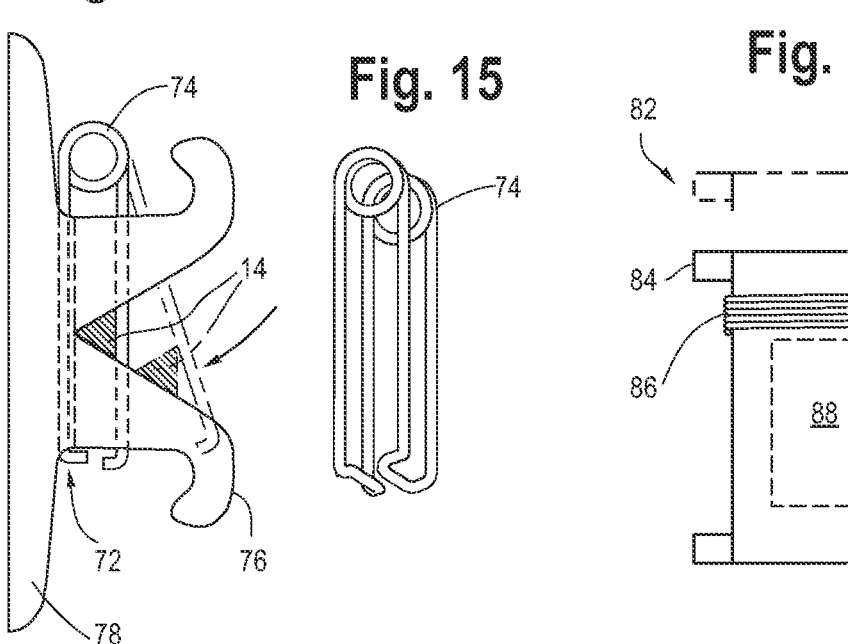
Fig. 15
Fig. 17
Fig. 16
Fig. 18
Fig. 19
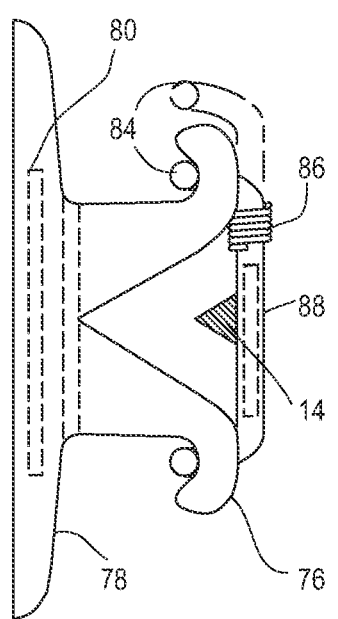
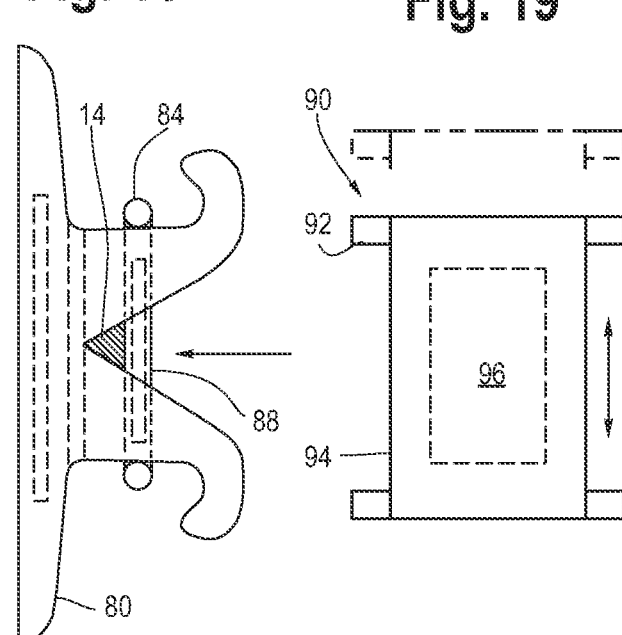

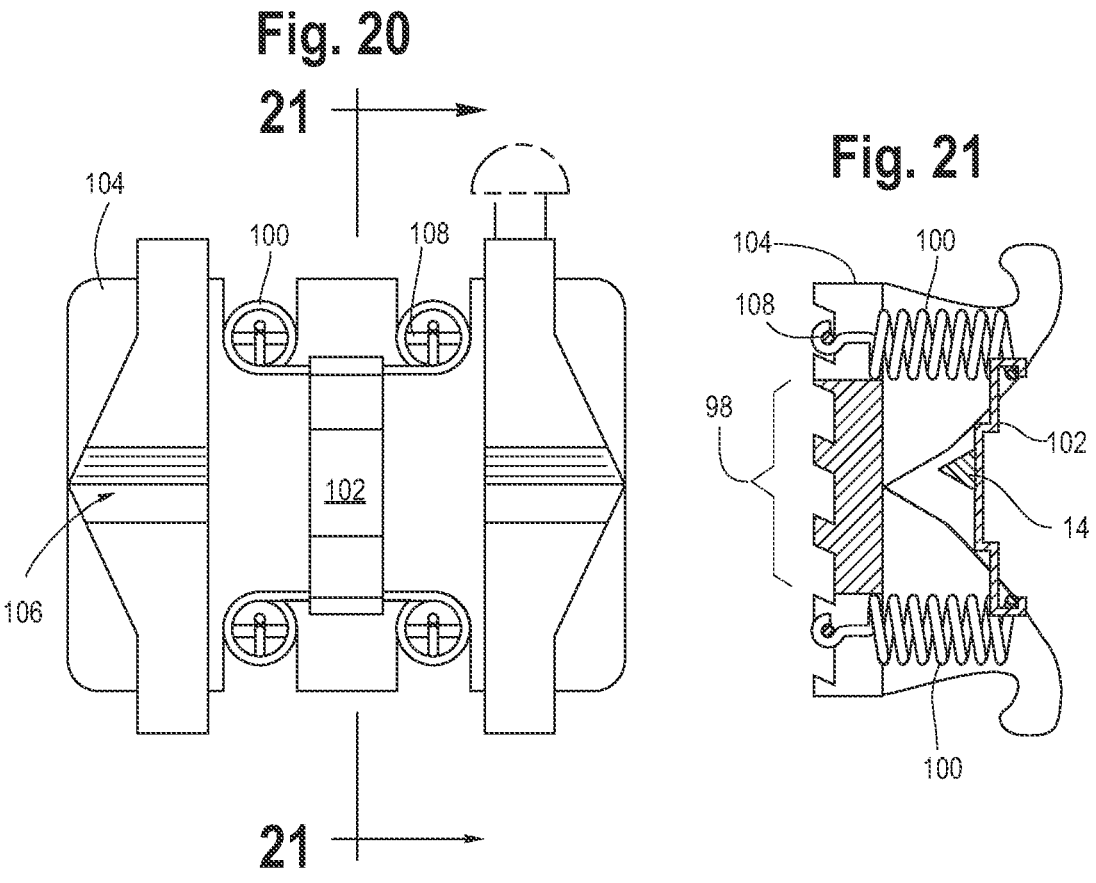
Fig. 20
Fig. 21
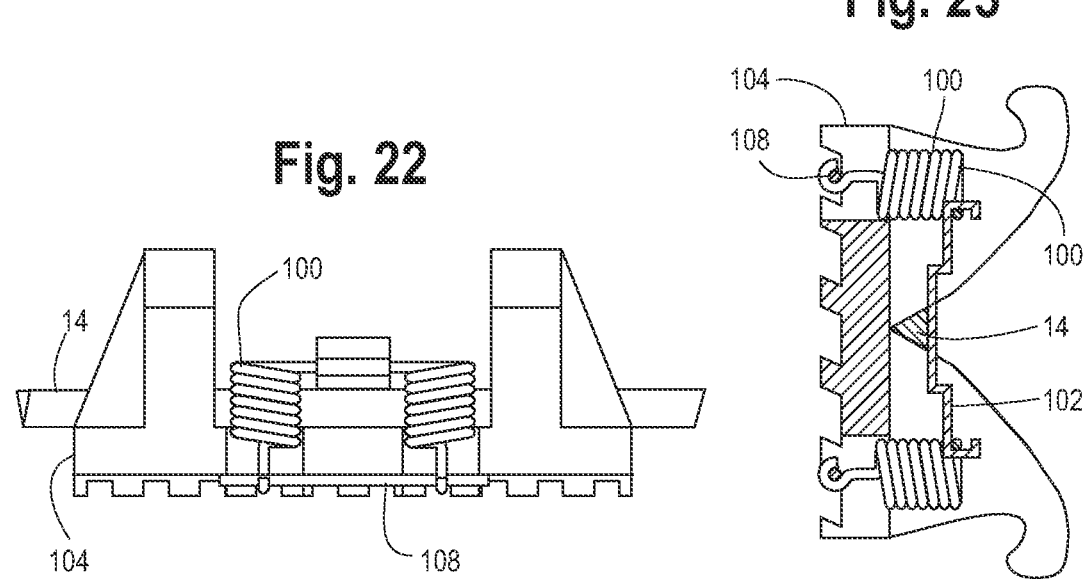
Fig. 22
Fig. 23

Fig. 33
172
168       170
Fig. 34
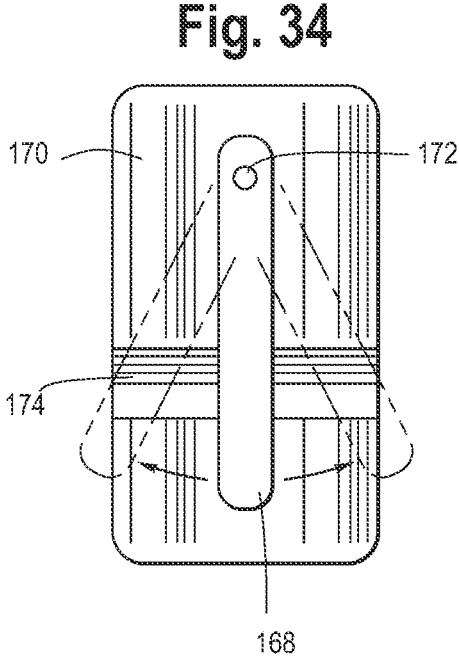
170     172
174
168
Fig. 35
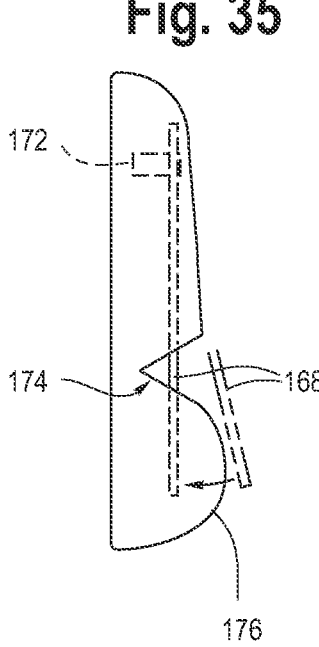
172
174    168
176

180

182

184

182

186

188

182

182

184

188

184

190

186

188

190

ORTHODONTIC APPLIANCE AND METHOD FOR MOVING TEETH

CROSS REFERENCE TO RELATED APPLICATIONS

This application claims priority from and the benefit of U.S. Provisional Patent Application Ser. No. 62/670,406, entitled "ORTHODONTIC APPLIANCE AND METHOD FOR MOVING TEETH," filed May 11, 2018, and U.S. patent application Ser. No. 16/406,269, entitled "ORTHODONTIC APPLIANCE AND METHOD FOR MOVING TEETH," filed May 8, 2019, both of which are hereby incorporated by reference in their entirety for all purposes.

FIELD

The disclosure relates generally to orthodontic appliances and methods of using orthodontic appliances to move teeth. In particular, an orthodontic system is disclosed to facilitate interaction between a bracket with a generally triangular slot, an archwire placed within the generally triangular slot, and a tensioning device configured to press the wire against a surface of the generally triangular slot. This interaction creates a "force module" that gradually, more precisely, and more consistent with the natural function of the body, moves the apex of the generally triangular slot toward the archwire into an effective engagement with the bracket.

SUMMARY

One aspect of the present disclosure is related to a braces system for moving a tooth or a plurality of teeth using a continuous force that may be lighter in magnitude than the strong intermittent forces associated with visits to the orthodontist when using conventional edgewise braces. The system comprises a bracket that is configured to be mounted to a tooth, and more particularly a plurality of brackets configured to be mounted to a plurality of teeth. The bracket may comprise a pair of wings that define a slot having oppositely disposed upper and lower surfaces, the upper and lower surfaces converging at an apex. A wire is positioned within and runs through the slot and then held in place within the slot by a tensioning device. The tensioning device is configured to press the wire against a surface of the slot. Initially, the wire is positioned at a desired distance from the apex of the slot and the system is configured so that, over time, the bracket and the tooth upon which the bracket is mounted gradually moves toward the wire. For instance, as the tooth moves in the desired direction, the wire may be pressed further down the surface of the slot, such as by force from the tensioning device, such that the bracket moves toward the wire to a desired position for the tooth. In some embodiments, the bracket may be configured and mounted on the tooth so that the wire is positioned in the apex of the slot when the tooth reaches its desired location, orientation, etc.

In some embodiments, the tensioning device may be attached to the bracket. For instance, in some embodiments, the tensioning device may comprise an O-ring, a clip, a cap operatively attached to one or more springs, or a magnetically-operated cap. In some embodiments, the bracket may comprise one or more elements configured for the secure attachment of a tensioning device. For example, in some embodiments, the bracket may comprise a clip-receiving slot into which a first portion of the clip may be inserted, such that a second portion of the clip is positioned within the slot formed by the wings of the bracket. In other embodiments, the tensioning device may be integrally formed with the bracket.

In some embodiments, the tensioning device may be configured so that the amount of force applied by the tensioning device against the wire may be manually adjusted. For instance in some embodiments the tensioning device may be tuned to provide a desired amount of pressure against the wire. This could be done, for example, either with the clip attached or detached from the bracket and would not require the removal of the bracket or wire. In other embodiments, the system may be configured so that a number of different tensioning devices may be attached to the bracket so that one could adjust the amount of pressure against the wire. This pressure could be adjusted by replacement of a first tensioning device with a second tensioning device, without the need for removal of the bracket or the wire.

In some embodiments, the apex of the slot and the wire may be configured so that the wire fits snugly within the apex of the slot, thereby ensuring that the pressure placed on the wire is effectively and efficiently transferred to the tooth. For instance, in some embodiments, the upper and lower surfaces of the slot may form a 60-degree angle at the apex and the wire may have a triangular cross-section containing three 60-degree internal angles.

In some embodiments, the system may also be configured to be capable of responding to an external pressure placed on the tooth, such as from a biting force that may occur when the wearer eats. In particular, the system may be configured so that a tooth and its supporting structures can function normally when a vertical biting pressure is placed on it by sliding first toward the bone along the lower angled surface and sliding back to the original position after the pressure is released. This system reduces the effect of external vertical pressure placed on the tooth to transmit the same or similar forces to adjacent teeth. For instance, the tensioning device may act as a sort of shock-absorber, such as by allowing flexing of the wire vertically along the lower inclined plane when a hard object (e.g., food) comes into vertical contact with the wire. This reduces pressure on the teeth and brackets and avoids breakage of the bracket itself, resulting in a lessening of the pressure placed on the tooth by the tensioning device from biting. This allows for the tooth to function in a more biological, and thus more comfortable, manner when chewing food.

Another aspect of the present disclosure is related to a method for moving a tooth, and preferably a method for moving a plurality of teeth, using a continuous force that is lighter in magnitude than the strong intermittent forces associated with visits to the orthodontist when using conventional edgewise braces. The method comprises mounting a bracket to a tooth, and in many embodiments mounting a plurality of brackets to a plurality of teeth, wherein the bracket comprises a slot having oppositely disposed upper and lower surfaces that converge at an apex. A wire is placed within (and running through) the slot and a tensioning device is brought into contact with the wire so as to press the wire against a surface of the slot, thereby imparting a force on the tooth. Initially, the wire may be positioned at a distance from the apex of the slot and over time, the apex of the slot (and bracket and associated tooth) may gradually move toward the wire. For instance, as the tooth moves in the desired direction, the wire may be pressed further down the surface of the slot toward the apex of the slot. In some embodiments, the method may comprise mounting the bracket on the tooth so that the wire is positioned in the apex of the slot when the tooth reaches its desired location, orientation, etc. By performing this method the force placed on a tooth may be localized and substantially independent from the forces placed on adjacent teeth, allowing for a higher degree of control over the process of moving one or more teeth than is achieved by conventional methods.

In some embodiments, the wire may run substantially straight through the slot, such that the wire is pressed against the upper surface of the slot or the bottom surface of the slot, but not both. In other embodiments, the wire may be positioned to run angularly through the slot, such that a first portion of the wire is pressed against an upper surface of the slot and a second portion of the wire is pressed against a lower surface of the slot. The latter may be useful, for instance, where it is desired to tilt the tooth such as when the tooth is undesirably leaning frontward or backward. Accordingly, the movement and tilting of the tooth may be achieved without a particularized bending of the wire. An unavoidable and uncorrectable consequence of conventional orthodontics is that any deflection of a wire will result in undesirable tooth movement and/or "round-tripping." In particular, the term "round-tripping" was originally used to describe teeth moving in one direction and then reversed to gain the final desired position. In conventional orthodontics, round-tripping occurs when adjacent anchorage teeth unnecessarily adjust their positions due to a wire deflected from them to gain desirable movement of an adjacent displaced tooth and then return to their original positions. The presently disclosed systems and methods are designed such that deflection of the wire is unnecessary for moving teeth, and round-tripping and associated movement is largely avoided. Thus, the gradual movement from the bracket as the apex is drawn toward the wire is contrary to the principles that have governed conventional orthodontics.

Another aspect of the present disclosure is related to a system and method for independently moving a plurality of teeth using a plurality of brackets and a single wire. The method comprises mounting a plurality of brackets on a plurality of teeth, wherein each of the brackets has a slot. A wire is then placed within and running through the slots of each bracket. At each bracket, a localized force against the wire is provided, such as through the use of a plurality of independent tensioning devices. Accordingly, each bracket-bearing tooth is provided with an independent force. For instance, the localized force against the wire at a first bracket may be different from the localized force against the wire at the second bracket, which may cause a first tooth to move independently from the second tooth. This may be the case even where the first tooth and the second tooth are adjacent.

In some embodiments, the forces independently provided to each tooth may be controlled by selection and/or adjustment of a particular tensioning device. For instance, the localized force against the wire at a first bracket may be provided by a first tensioning device and the localized force against the wire at a second bracket may be provided by a second tensioning device. The first and second tensioning devices may differ in the localized forces provided by each, even where the first and second tensioning devices may be of generally the same type. For instance, each of the first and second tensioning devices may be clips, but the distinct clips may each be configured to provide a different degree of pressure on the wire.

Another aspect of the present disclosure is related to a system and method for moving a tooth or a plurality of teeth without causing any torsional movement to the anchorage teeth, i.e. without impacting the position or orientation of the anchorage teeth. The method comprises mounting a bracket on the tooth, or a plurality of brackets on the teeth, wherein the bracket contains a slot. Then, a wire is placed within the slot and anchored to at least two anchorage teeth. A localized force against the wire is provided, the localized force pressing the wire against a surface of the bracket to impart a localized force on the tooth, such that the force placed on the tooth is not transferred to the anchorage teeth by the wire as generally occurs with conventional edgewise braces. The specific embodiments of the brackets and tensioning devices described herein may be used to practice this method, although it is contemplated that other embodiments not specifically described herein may also be used.

Another aspect of the present disclosure is related to a system and method of moving one or more teeth into a desired final position using a single continuous adjustment period, meaning that a wearer will not need to have the wire replaced during movement of the tooth/teeth. The method comprises mounting a bracket to a tooth, the bracket comprising a slot having oppositely disposed upper and lower surfaces that converge at an apex. The method further comprises placing a wire within the slot and bringing a tensioning device into contact with the wire so as to press the wire against a surface of the slot. Initially, the wire may be positioned at a distance from the apex of the slot and over time, the apex of the slot (and bracket and associated tooth) may gradually move toward the wire. For instance, as the tooth moves in the desired direction, the wire may be pressed further down the surface of the slot toward the apex of the slot. Because the force provided by the pressing of the wire against bracket by the tensioning device is continuous, the tooth may be moved to a desired final position without the need for manually reconfiguring or replacing the wire, as is typically necessary using conventional edgewise braces.

Another aspect of the present disclosure is related to an orthodontic apparatus (commonly referred to as braces) configured to efficiently and effectively move a tooth or a plurality of teeth without a significant loss of force between the wire and the bracket due to tolerance or "play" of the wire within the slot. For example, conventional orthodontic appliances with slots that, by necessity of their design, have tolerances or play. The apparatus comprises a bracket that is configured to be mounted to a tooth and that includes a pair of wings defining a slot having oppositely disposed upper and lower surfaces that converge at a triangular apex. The apparatus also comprises a triangular wire configured to run through the slot and a tensioning device configured to press the wire against a surface of the slot to continually and gradually apply a force against the teeth, in contrast to conventional orthodontic appliances. The dimensions of the triangular wire and the dimensions of the triangular apex of the slot may be configured so be substantially identical which leads to more accurate positioning of the teeth. For instance, in some embodiments, the upper and lower surfaces of the slot may form a 60-degree angle at the apex and the wire may have a triangular cross-section containing three 60-degree internal angles.

Another aspect of the present disclosure is related to a system for moving a first tooth in a patient's mouth that includes a bracket having a surface configured to be mounted to a first tooth and a pair of wings defining a slot having oppositely disposed first and second surfaces that converge at an apex. A wire runs through the slot at a distance from the apex, and a tensioning device provides a force pressing the first surface of the slot toward the wire. The system is configured so that the tensioning device gradually moves the apex of the slot toward the wire. In some embodiments, the tensioning device is attached to the bracket.

In some embodiments, the tensioning device comprises an O-ring, a clip, a cap operatively attached to one or more springs, or a magnetically-operated cap. In some embodiments, the bracket comprises a clip-receiving slot and the clip is inserted into the clip-receiving slot to attach the clip to the bracket. In some embodiments, the one or more springs are positioned in the cap, in the bracket, or both. In some embodiments, the magnitude, direction, or both of the force pressing the first surface of the slot toward the wire is adjustable. In some embodiments, the first and second surfaces of the slot form a 55 to 65-degree angle at the apex. In some embodiments, the wire is a triangular wire configured to fit in the apex.

In some embodiments, the system is configured so that the system is capable of responding to an external pressure placed on the first tooth by changing the magnitude, direction, or both of the force pressing the first surface of the slot toward the wire. In some embodiments, such that an external pressure placed on the first tooth having a certain magnitude and direction reduces the magnitude of the force pressing the first surface of the slot toward the wire.

Another aspect of the present disclosure is related to a method for moving a first tooth in a patient's mouth. The method includes mounting a bracket to the first tooth, the bracket comprising a slot having oppositely disposed first and second surfaces that converge at an apex, placing a wire within the slot, and bringing a tensioning device into contact with the wire so as to provide a force pressing the first surface of the slot toward the wire at a distance from the apex, thereby imparting a force on the first tooth. The tensioning device is configured to gradually move the apex of the slot toward the wire.

In some embodiments, the magnitude, direction, or both of the force on the first tooth is independent from the forces placed on adjacent teeth. In some embodiments, the wire is positioned within the slot so that the tensioning device presses a first portion of the wire against the first surface of the slot and a second portion of the wire against the second surface of the slot. In some embodiments, the tensioning device comprises an O-ring, a clip, a cap operatively attached to one or more springs, a magnetically-operated cap, or a combination thereof.

In some embodiments, the bracket comprises a clip-receiving slot and the clip is inserted into the clip-receiving slot to attach the clip to the bracket. In some embodiments, the one or more springs are positioned in the cap, in the bracket, or both. In some embodiments, further comprising adjusting the amount of force by which the tensioning device presses the first surface of the slot toward the wire. In some embodiments, adjusting the amount of force by which the tensioning device presses the first surface of the slot toward the wire comprises tuning the tensioning device.

In some embodiments, adjusting the magnitude, direction, or both of the force by which the tensioning device presses the first surface of the slot toward the wire comprises replacing a first tensioning device with a second tensioning device. In some embodiments, the magnitude of the force imparted on the first surface of the slot toward the wire is reduced in response to an external pressure placed on the first tooth. In some embodiments, the tensioning device temporarily moves the apex of the slot away from the wire in response to an external pressure placed on the first tooth.

Another aspect of the present disclosure is related to a method for moving a first tooth in a patient's mouth. The method includes mounting a first bracket on a first tooth and a second bracket on a second tooth, the first bracket comprising a first slot defining a first surface and the second bracket comprising a second slot defining a second surface, placing a wire first and second surfaces, providing a first localized force between the wire and the first surface, and providing a second localized force between the wire and the second surface, in which the second force is the same as or different from the first force, thereby imparting an independent force on each of the first and second teeth.

In some embodiments, the first localized force is provided by a tensioning device attached to the bracket. In some embodiments, in which the first localized force and the second localized force are different in magnitude. In some embodiments, the first localized force is provided by a first tensioning device and the second localized force is provided by a second tensioning device. In some embodiments, each of the first and the second tensioning devices comprises a clip attached to the associated bracket. In some embodiments, in which the first tensioning device is different from the second tensioning device.

BRIEF DESCRIPTION OF THE DRAWINGS

The disclosure includes a number of drawings and supporting description, which are provided for the purpose of illustrating and clarifying some non-limiting aspects and embodiments of the disclosure. The drawings should not be viewed as limiting the spirit or scope of the invention.

FIGS. 14 and 15 are side elevation views, with underlying parts shown in dashed lines, showing a nickel-titanium wire clip engaging a bracket and a wire, interchangeable with any of the above, according to an embodiment of the present application.

FIG. 16 is a view similar to FIG. 14, but showing a magnetic pillow-style clip engaging a bracket and a wire, interchangeable with any of the above, according to an embodiment of the present application.

FIG. 17 is an isolated front elevation view, with underlying parts shown in dashed lines, of the magnetic pillow-style clip of FIG. 16.

FIG. 18 shows the system of FIG. 16 with the magnetic pillow-style clip forcing the wire and apex together, according to an embodiment of the present application.

FIG. 19 is a view similar to FIG. 17 of the magnetic pillow-style clip, according to an embodiment of the present application.

FIG. 20 is a front elevation view of an alternative bracket with helical springs in the base, according to an embodiment of the present application.

FIG. 21 is a section taken along section lines 21-21 of FIG. 20.

FIG. 22 is a bottom plan view of the bracket of FIG. 20, showing the wire and apex advanced together.

FIG. 23 is a view similar to FIG. 21, showing the wire and apex advanced together.

FIGS. 33-35 are a perspective, a rear elevation, and a side elevation view, with dashed lines showing movement or underlying parts, of a lingual system with a first style of self-ligation, according to an embodiment of the present application.

Figure 1:
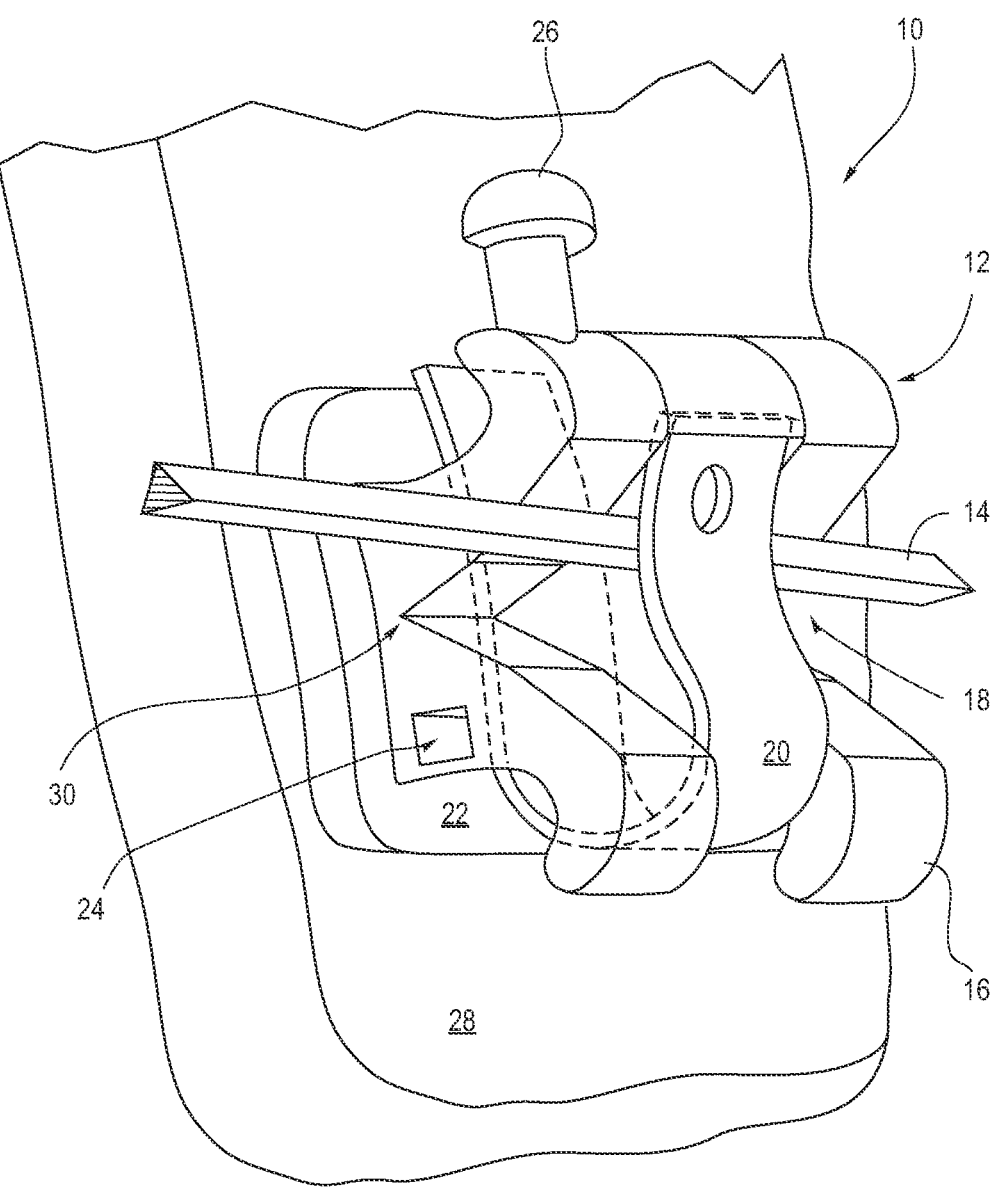
FIG. 1 is a perspective view of an orthodontic system according to an embodiment of the present disclosure, showing the wire running substantially straight through the slot (and held in contact with the upper surface of the slot by a clip).

The foregoing summary, as well as the following detailed description of certain embodiments of the present application, will be better understood when read in conjunction with the appended drawings. For the purposes of illustration, certain embodiments are shown in the drawings. It should be understood, however, that the claims are not limited to the arrangements and instrumentality shown in the attached drawings. Furthermore, the appearance shown in the drawings is one of many ornamental configurations that can be employed to achieve the stated functions of the system.

The following is a list of the reference characters used in this specification and the parts they identify:

| 10 orthodontic appliance | 21 section lines | 150 base |
|---|---|---|
| 12 bracket | 98 region of the base | 152 clip |
| 14 wire | 100 springs | 154 springs |
| 16 wings | 102 clip | 156 posts |
| 18 slot | 104 base | 158 slots |
| 20 clip | 106 slot | 160 hook |
| 22 base | 108 fasteners | 162 system illustrating |
| 24 horizontal | 110 clip | helical springs |
| auxiliary slot | 112 spring | 164 interconnecting bar |
| 26 tube | 114 hinge | 166 clip |
| 28 tooth | 116 pin | 168 clip |
| 30 apex | 118 latch | 170 bracket |
| 32 portions | 120 clip | 172 pin |
| 34 portion | 122 opening | 174 slot |
| 36 arrow | 124 bars | 176 barrier |
| 40 orthodontic system | 126 tool | 192 spacers |
| 42 bracket | 128 manipulator | 194 protractor-style |
| 44 tab | 130 bracket wings | markings |
| 46 perforations | 132 channels | 200 molar tube design |
| 48 wing | 134 surface | 202 additional round |
| 60 system | 136 springs | tubes |
| 62 plate | 140 clip | 204 slope |
| 64 clip | 142 spring | 206 breakaway tab |
| 66 wings | 144 posts | 208 bracket |
| 68 slope | 146 hook | 210 auxiliary slot |
| 70 base | 148 void | 212 C-type clip |
| 72 convex-configured slot | | |

DETAILED DESCRIPTION

Generally speaking, this application discloses an orthodontic system to facilitate interaction between a bracket with a triangular slot optionally having a 60-degree angle at its apex, a wire, optionally an equilateral triangular or round wire, and a tensioning device configured and arranged to create a localized tension between the wire and a surface of the slot. The bracket is secured to a tooth of an orthodontic patient. This interaction creates a force module that gradually, more accurately and more consistent with the natural function of the body, moves the wire and bracket toward one another into a full and total engagement, thus moving the tooth secured to the bracket into or toward its intended position at the conclusion of orthodontic treatment.

The specialty of orthodontics has a multitude of different approaches for moving teeth, and all have tried to fulfill the goals of an ideal orthodontic appliance; namely, the capability of moving any tooth in any plane of space, individually or in groups, in either dental arch, while exerting differential, more natural, non-destructive forces on the dentition. Edward Angle, in 1928, was the first to address the goal of control in all planes with his "Edgewise Appliance." Despite nearly ninety years of orthodontic innovations and advances in diagnostic and treatment modalities, the basic design, application and philosophy of treatment with the conventional edgewise appliance remains virtually unchanged, and the other stated goals have not been adequately met.

The reason for these goals having gone unfulfilled stems from the limitations of the conventional designs. This conventional appliance relies on the full engagement of a round or rectangular wire in a deflected state to move teeth. Unfortunately, there are a number of problems associated with this appliance. The first is that full engagement of the wire creates the highest level of force upon insertion of the wire. This high level of force is associated with pain and discomfort to the patient as well as an increased potential for root resorption and undermining resorption of the bone.

While orthodontic research has documented that light, continuous forces are what move the teeth in the least deleterious fashion, the only improvement that has helped the conventional edgewise appliance move toward that goal has been a metallurgical improvement in the archwires. Nickel-titanium archwires have given greater range and memory to the wires, but the mechanism of movement is still the same.

A second significant disadvantage of the conventional edgewise appliance is that while torsional movement can occur with the use of a rectangular wire twisted along its long axis, only small movements will occur in one adjustment period, and adjacent teeth are used as anchorage to allow the programmed change. Unfortunately and unavoidably, these adjacent teeth used for anchorage in order to move the desired tooth will themselves move due to the twisting of the wire to engage the tooth being moved.

A third major disadvantage of the conventional edgewise appliance is that whatever amount of torsional movement is placed in the archwire, that amount of torsion will never be delivered to the teeth. By virtue of the design, no wire, be it round or rectangular, will fit the slot without play or tolerance. Depending on the cross-sectional size of the archwire, the amount of "play" can be as much as 7 degrees for each 0.001-inch increment difference between the height of the slot and the vertical thickness of the wire placed in the slot. Since manufacturing tolerances allow for significant differences in the slot size, the unpredictability becomes even worse.

In contrast, the presently disclosed system, an example of which is shown in FIG. 1, can be described as comprising a sliding inclined plane between a pair of bracket wings upon which the wire interacts, providing significant improvements in each of these three major points. The presently disclosed system also offers many additional advantages that are described in greater detail below with reference to the orthodontic appliance and methods disclosed herein. For example, the disclosed system does not require full engagement of the archwire to effect desired positioning of the teeth, thereby creating a more desirable and biologically compatible movement of the teeth.

In another example, since tooth movement in the disclosed system is controlled by the bracket/wire/tensioning device interface (hereafter referred to as an independent "force module"), not the deflective force of the archwire seen in conventional systems, each tooth moves independently, thereby eliminating the unwanted movement of adjacent teeth, especially in torsional control. Clinically, this reduction of unwanted movement is highly desirable. In some disclosed embodiments, the amount of movement of the teeth, especially in torsional movement, will be exactly what is programmed. In some embodiments, the movement of the teeth will also be significantly more than what would have occurred in the conventional systems, such as the conventional edgewise system. This may occur, for instance, because the 60-degree internal angle of an equilateral triangle will fit exactly without play into the 60-degree angle of the bracket placed on each tooth.

To date, all fixed orthodontic appliances have relied on the attachment of a wire that deflects from its passive configuration to engage within a rectangular slot incorporated within a bracket bonded or banded to one or more teeth for the purpose of moving said teeth to a new position dictated by the passive position of the wire. For any of these orthodontic appliances to work effectively, with control in one, two or three dimensions, a round or rectangular wire must be fully engaged within the bracket slot, with the maximum force of deflection occurring as soon as the wire is engaged, and dissipating as the tooth is moved to the passive position of the wire.

The process of moving teeth in this fashion means that the greatest amount of force placed on the teeth, and the subsequent pain produced, occurs immediately following the engagement of the archwire. This so-called "cycle of pain" is well known to millions of orthodontic patients since 1928 when the Edgewise Appliance was introduced and became the basis for nearly every fixed orthodontic appliance currently in use.

The disclosed appliance and method of moving teeth does not rely on the full engagement of the deflected wire within a slot to effect movement. In fact, it does not rely on the flexibility of the wire at all. Instead, the disclosed system facilitates interaction between a triangular slot having nonparallel sides, a wire that serves as a guide, and a tensioning device configured and positioned to place a localized force on the wire within the slot. The disclosed combination of components creates a force module that will gradually, more accurately and more physiologically move the wire and bracket into a full and total engagement. Instead of heavy, intermittent forces being placed on teeth and dependent on the physical properties of the wires, the disclosed system results in lighter, continuous forces that can be controlled by a tensioning device such as a self-ligating clip (see, e.g., the several figures for multiple included configurations), elastomeric O-rings, and/or other forms of gentle, continuous force.

The appliance includes individual attachments fixed to each tooth to be controlled, either all or any number less than all the teeth, by guide wires that will connect all teeth to be controlled, and a form of connection between the individual attachment and the guide wire. From this point forward, the individual attachments will be called brackets and/or tubes, which may vary in configuration according to the type of tooth to which the attachment is connected. These brackets can either be bonded with an appropriate adhesive directly to the tooth, or attached to a flat stainless steel ring that fits the circumference of the tooth and is cemented with an appropriate cementing medium. The guide wires will be referred to as wires or archwires. These archwires are shaped according to the desired archform of each anatomical configuration of the maxillary and mandibular group of teeth. The form of connection between the brackets and the archwire will be referred to as tensioning device clips or O-rings, which supplies the force necessary to bring the wire gradually and tightly into the apex of the bracket slot.

FIG. 1 is a perspective view of an orthodontic appliance 10 with a bracket 12 that may include a pair of bracket wings 16 on opposite edges. Thus, the attachment or ligating wings 16 define a diverging plane slot 18, optionally with a 60-degree angle at an apex 30, and optionally with trumpeted edges at the external edges of the slot 18 to increase the opening of the slot 18 to make it easier for the slot 18 to receive the archwire 14. As shown, the wire 14 (e.g., archwire, guidewire) runs substantially straight through the slot 18 and is held in contact with a surface of the slot 18 by a tensioning device 20, such as a clip. The bracket 12 has a base 22 that is fixed to a tooth 28, such as by an adhesive. Optionally, a tube 26 can be included for attachment of auxiliary appliances, such as elastics or coil springs.

The bracket 12 may be formed of a rigid material such as, but not limited to, stainless steel, ceramic, acrylic, composite, Food and Drug Administration (FDA) approved resins, and/or titanium materials. In some embodiments, the bracket 12 may also comprise a vertical slot in the base 22 to accommodate the attachment of a tensioning device, such as a clip that may slide vertically between the laterally placed wings 16 of the bracket 12. In some embodiments, the bracket 12 may also comprise a horizontal auxiliary slot 24 for auxiliary attachments as needed for additional torsional or rotational movements. Although shown substantially straight, in FIG. 1, in some examples the wire 14 extends through the slot 18 at an angle.

Figure 44:
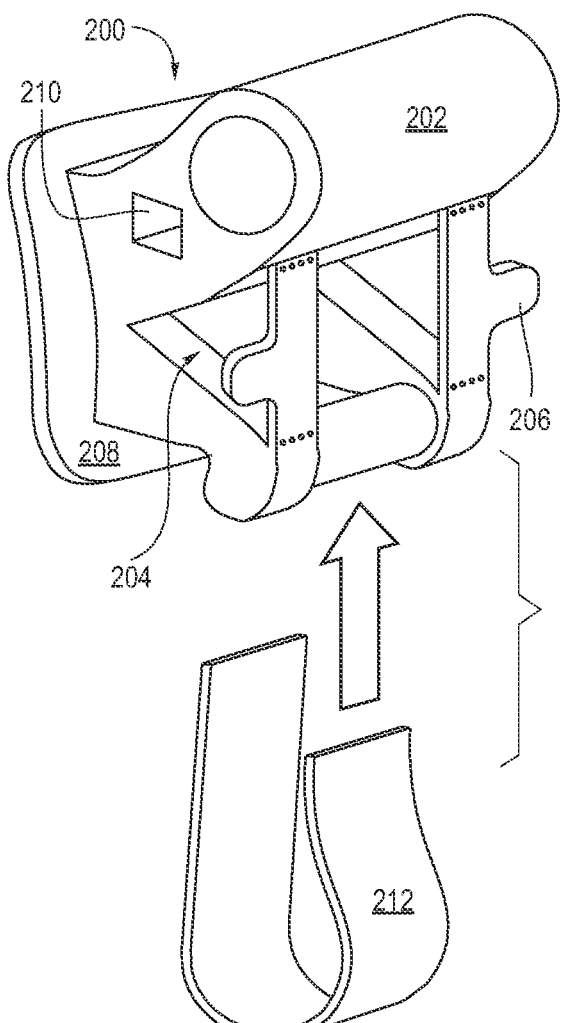
FIG. 44 is an exploded perspective view.
Figure 45:
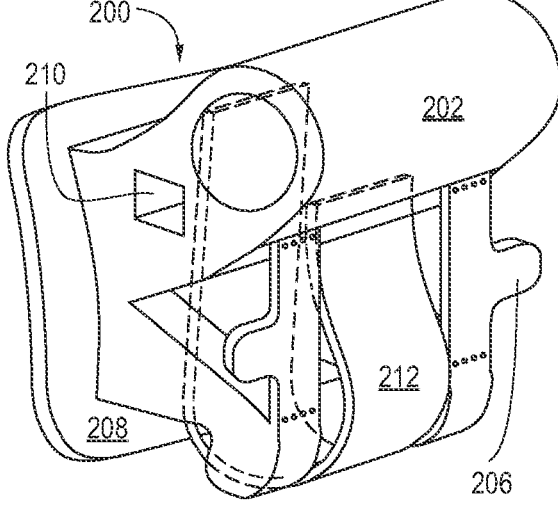
FIG. 45 is a perspective assembly view.
Figure 46:
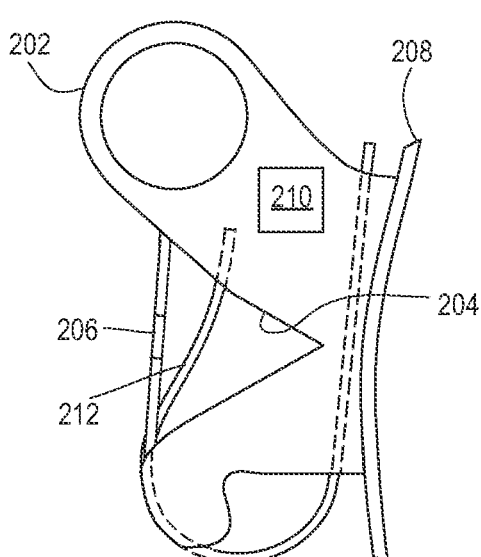
FIG. 46 is a side elevation view showing a molar tube design with a C-clip to insure accurate labio-lingual positioning of the wire in the apex of the slot. This design can also be utilized for improved accuracy with the conventional appliances by using a rectangular slot instead of the triangular slot, according to an embodiment of the present application.

In the case of tubes, there may be additional round tubes 202 on FIGS. 44, 45, 46 for attachment of auxiliaries, such as headgear, expansion wires, Herbst appliances or other yet to be developed auxiliaries.

Figure 2:
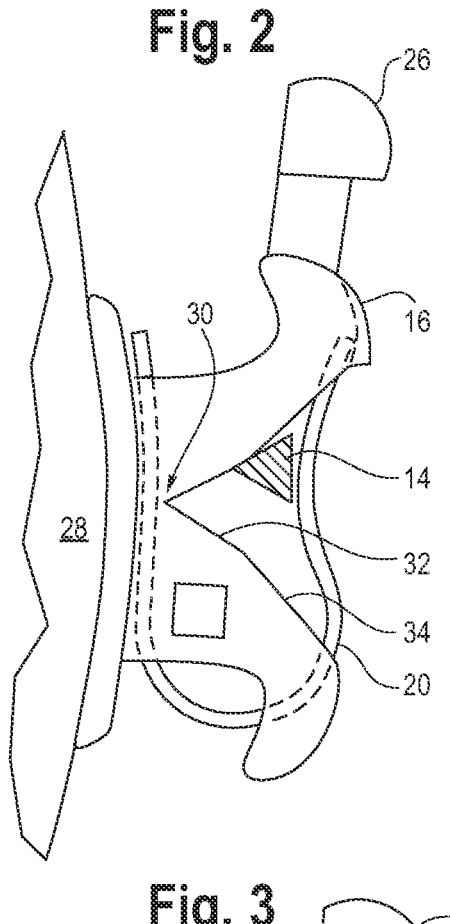
FIGS. 2 and 3 are side elevation views of the orthodontic system of FIG. 1, showing progression of the bracket 16 toward the wire 14, according to an embodiment of the present application.
Figure 3:
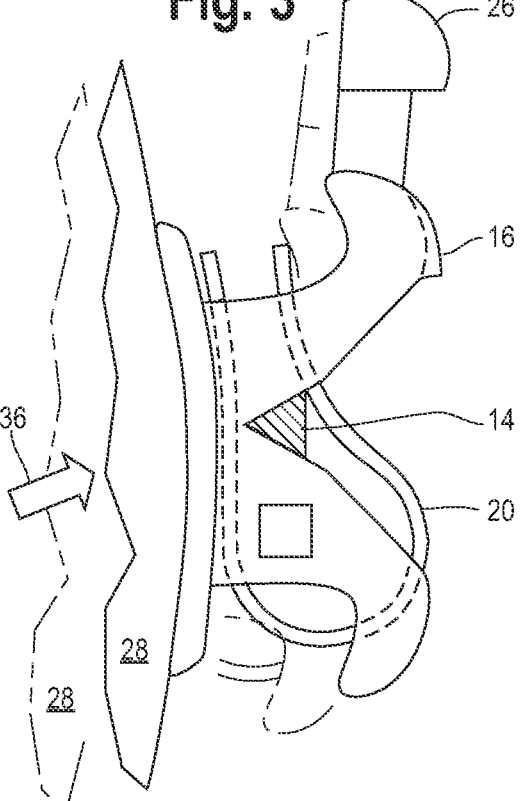

FIGS. 2 and 3 illustrate a side view of the orthodontic system 10 of FIG. 1. As shown, the diverging planes that define slot 18 may have two portions 32 and 34 defined by different angles. In this example, opposing portions 32 meet at the apex 30 with an approximate 60-degree angle, whereas the angle associated with portion 34 is more obtuse. This allows for a wider opening into which to place the wire 14, as well as encouraging a lighter force profile when wire 14 is in contact with a surface of portion 34 versus portion 32. Although FIGS. 1-5 are shown with two different angles along slope 18, the angle could have a flat surface of a single, constant angle (e.g., 60-degree angle). In other examples, the apex 30 can open with an ever-changing gradient to the tip of wings 16, or other suitable variation on the slope to aid in urging the wire 14 to the apex 30 in a consistent, gradual manner.

Further, FIG. 2 shows the wire 14 removed from the apex 30. For example, tooth 28 may be in an undesirable position, and the wire 14 is placed into the slot 18 such that contact is made with the surface of a wing 16. Clip 20 applies a force against the wire 14 to urge the apex 30, and therefore the bracket 12 and associated tooth 28, toward the wire 14. As shown in FIG. 3, the combination of forces (i.e. the "force module") urges the tooth 28 into alignment with the wire 14 to a desired position, as determined by the wire 14, shown by arrow 36.

The system 10 shown in FIGS. 1-3 illustrate how the various components cooperate to provide light, continuous forces which are self-limiting and constant as the wire's leading edge moves toward the apex of the slot. In particular, the force generated by the appliance is dependent on and limited to the force generated by the force module. Therefore, force levels for individual modules can be customized using different clips or by individually adjusting/tuning the clips. In some examples, the force applied on the wire from the clips moves the bracket toward the wire into the desired position.

Figure 4:
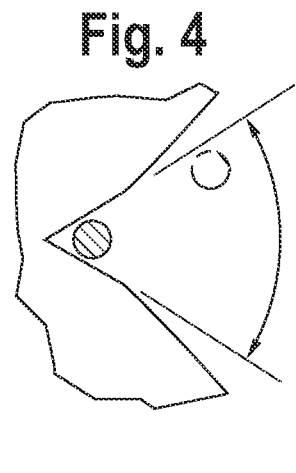
FIGS. 4 and 5 are schematic detail views similar to FIGS. 2 and 3, showing a mechanism of relative movement of a bracket and a wire within a disclosed system, according to an embodiment of the present application.
Figure 5:
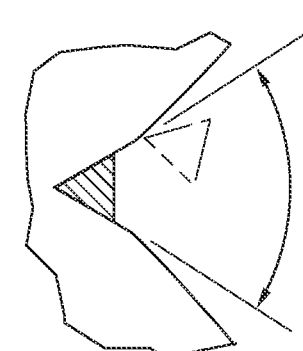

FIGS. 4 and 5 show a mechanism of movement of a wire within a disclosed system, as described herein. Thus, the wires slide against a surface of a wing to urge movement of the tooth to align with the archwire (e.g., such as by application of force from a tensioning device, clip, etc.). The archwires may be formed of any material that will allow the practitioner to create an archform appropriate for the alignment of the teeth. Examples include, but are not limited to stainless steel, cobalt-chrome, nickel-titanium, Australian, fiber reinforced composite, composite, FDA approved resins, heat activated nitinol, copper nickel-titanium, or any other material suitable for forming a wire or other guiding device. Embodiments of the wires may be configured in two distinct cross-sectional shapes: round; or equilateral triangular with three 60-degree internal angles. A wire having an equilateral triangle cross-sectional shape functions in a manner that differs from that of other cross-sectional shape of wire conventionally used in orthodontics, as is described herein.

The unique design of the presently disclosed orthodontic system allows for precise control of tooth movement, in contrast to other fixed orthodontic appliances. For example, in the disclosed orthodontic system herein, there is no tolerance between the wire and the bracket slot when the two are fully seated at the apex of the slot. Inherent in any conventional edgewise design is the difference in the height of the wire versus the height of the slot. An example of the imprecision in conventional designs is as follows: for every thousandth of an inch difference between the wire's height dimension and the height of the bracket slot, there is a 7-degree difference in the amount of torsional movement that actually can occur from what was programmed into the wire. This challenge is overcome in embodiments of the disclosed system.

Figure 6:
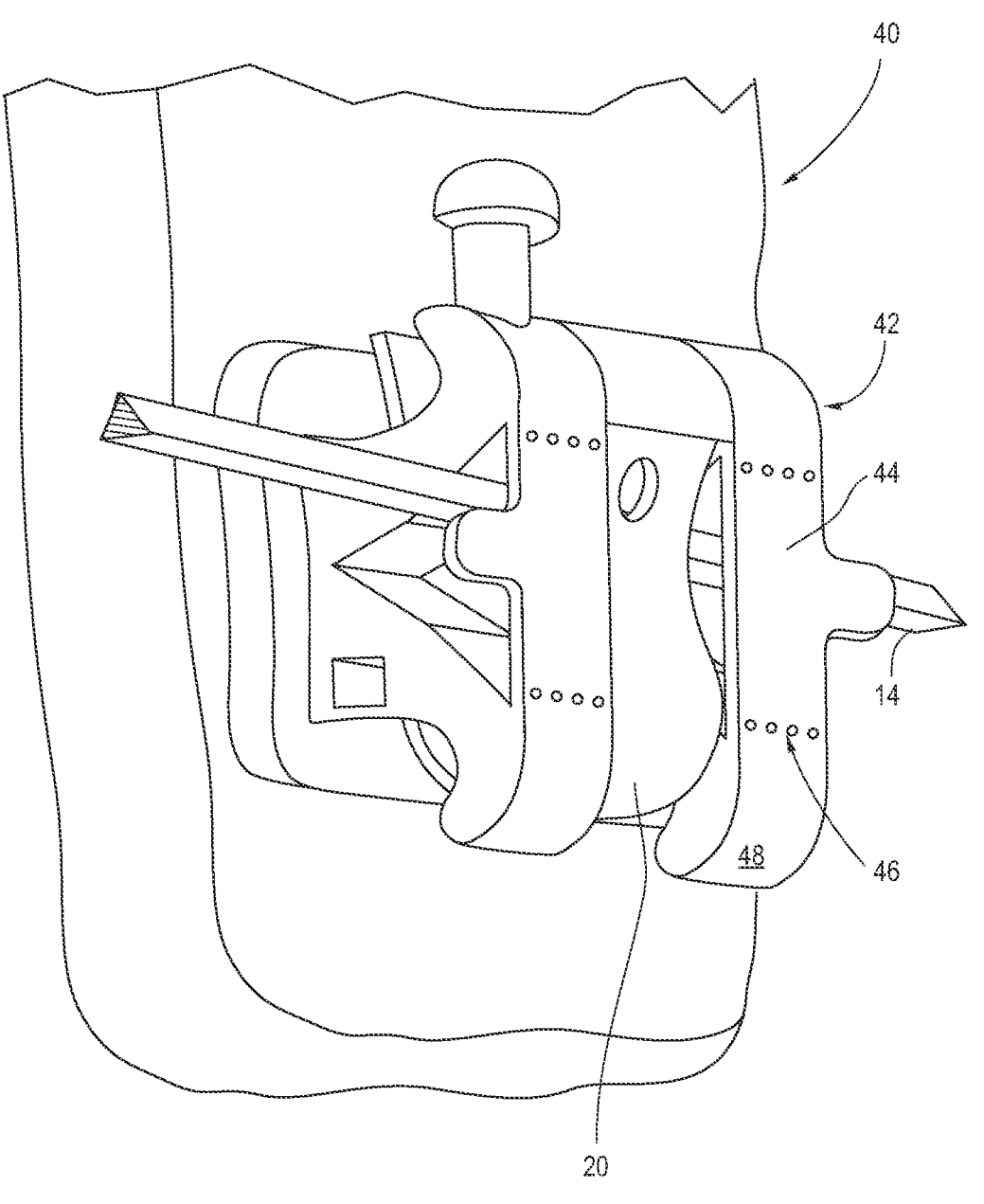
FIG. 6 is a perspective view of another orthodontic system, according to an embodiment of the present disclosure.

FIG. 6 is a perspective view of another orthodontic system 40 with the wire 14 running substantially straight through the slot and held in contact with a surface of wing 48 by a clip 20. In this example, bracket 42 includes a breakaway tab 44. The tab 44 may include perforations 46, or may be otherwise manipulable (such as with a cutting tool, etc.) to allow for easy removal.

Figure 7:
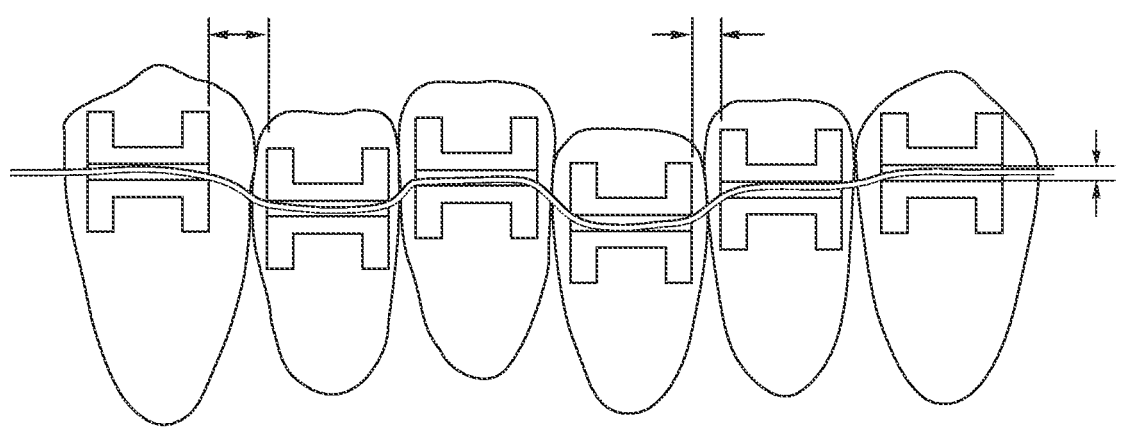
FIG. 7 is a schematic elevation view of an application of a conventional orthodontic system on several teeth.

FIG. 7 shows an application of a conventional orthodontic system on several teeth. As shown, the channel through which the wire engages with the bracket is necessarily narrow, as movement on the teeth is affected by full engagement between the bracket and the wire. The more a wire must deflect into a slot, the more undesirable movement that will occur. For instance, in a conventional appliance employing a rectangular channel, the wire may be sized substantially similar to the channel in order to make the required amount of contact to cause the rotational and/or torsional movement to adjust the tooth. Even in conventional systems with different geometric channels with different geometries (i.e. triangular), the channel requires full engagement between the bracket and the wire, causing a full force against the tooth. This full engagement also causes unnecessary forces acting on adjacent teeth, as a tight tolerance is needed between the wire and the bracket channel to generate movement in a tooth, such that the bend in the wire between brackets is sharp. This can cause the effected teeth to misalign, resulting in further discomfort and/or additional treatments to compensate for unnecessary movement.

Figure 8:
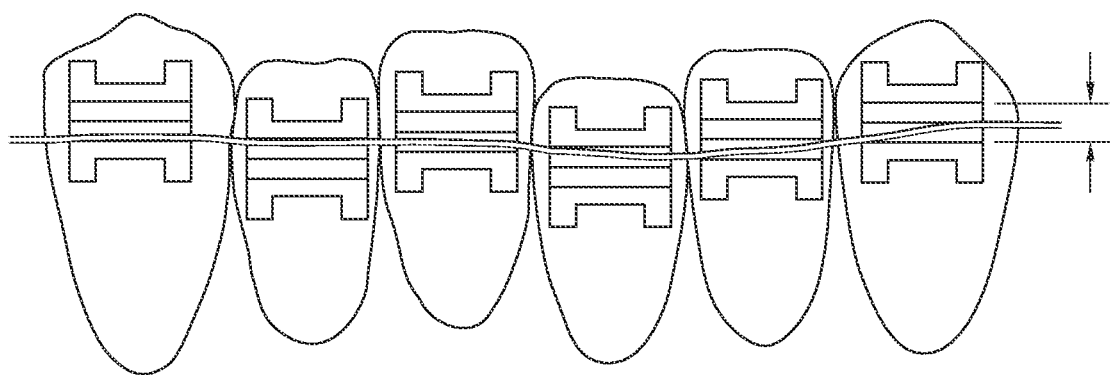
FIG. 8 is a schematic elevation view of an application of the presently disclosed orthodontic system on several teeth.

By contrast, FIG. 8 shows an application of the presently disclosed orthodontic system on several teeth. As shown, the present system benefits from the maximum occluso-gingival dimension of the opening of the slot (e.g., a 60-degree slot, or a slot of substantially similar angles such as a 50-70-degree slot) which is directly proportional to the depth of the slot, and the distance between the mesial and distal bracket wings, resulting in a synergistic anchorage arrangement across the six teeth. Unlike the conventional edgewise appliance using a rectangular slot (e.g., typically either a 0.018 or 0.022 inch wide slot), the slot in the presently disclosed system can be varied by changing the depth of the slot in order to increase the range by which the archwire can actively engage within the wings of the slot without deflection of the wire. This range may be two to three times wider than the dimensions possible with the conventional edgewise bracket, where teeth that are farther away from their ideal position will still have their brackets engage the archwire without needing the deflection of the archwire. In some examples, the angle of each slot can also be modified, as well as the width of the brackets and/or the distance between each bracket.

Figure 9:
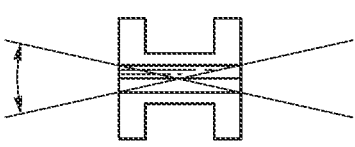
FIGS. 9 and 10 are two detail views of a bracket of FIG. 8, showing spacing detail of the presently disclosed orthodontic system of FIG. 8.
Figure 10:
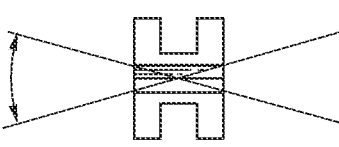

FIGS. 9 and 10 show spacing detail from of the presently disclosed orthodontic system of FIG. 8. For instance, another dimension that determines the range of engagement between the bracket and the wire is the distance between the mesial and distal wings of the bracket. For example, the wider the distance, the smaller the effective range of engagement. Conversely, the narrower the distance between the bracket wings, the greater the effective range of engagement.

For instance, for an orthodontic bracket to be effective, it needs to provide the ability to move a tooth in all three planes of space-vertical, horizontal or rotational, and torsional. Traditionally, conventional brackets have had inherent limitations in the effectiveness of movement in one of the planes of space because the appliance is dependent on the range of deflection of the archwires since the wires have to be fully engaged in the slot to work. Increasing vertical range of movement by narrowing the bracket increases inter-bracket distance giving the wire more room to bend between brackets but reduces the effectiveness of the rotational control and vice versa. Increasing the width of the bracket allows for very effective rotation, but reduces the range of torsional movement as well as vertical movement since the inter-bracket distance decreases and reduces the ability of the wire to deflect. In other words, orthodontists have, for decades, had to live with some form of compromise in the width of the brackets because there was no ideal bracket size or design that maximized movement in all three planes.

In the presently disclosed system, since the wire does not require any deflection to engage the bracket due to the large range of engagement and exclusive independent mechanism of movement, the inter-bracket distance can be minimal, the width of the bracket maximal and rotational-horizontal control, as well as vertical and torsional movement maximized. Compromise is no longer necessary with the presently disclosed orthodontic system.

The inter-wing distance can also influence the range of engagement, increasing the range of engagement by decreasing the inter-wing distance. This might, in some instances, be advantageous, and there will be a range of bracket widths and labial surface radiuses that an orthodontist will be able to choose from to semi-customize each individual case.

The slot is preferably 60-degrees, with the depth of the slot at least twice the height of the largest equilateral triangular wire. Triangular wires are equilateral for improved torsional force control and the properties of this cross-sectional configuration more closely mimic those of round torsion bars than any other configuration. Since round wires are not effective for torsional movement of teeth without a perpendicular arm welded or soldered to it, a suitable alternative to a round wire for torsional adjustment is an equilateral triangle, rather than rectangular or square wires used in the conventional edgewise appliance. The design of the body of the bracket will be dependent on the design of the various clips that have been created for the system. The curvature of the slot will be dependent on the mesio-distal (width) curvature of the tooth the bracket will be placed on, and consistent with the overall arch form.

Due to the increased accuracy of the appliance in each plane of movement, the device is suited for customization based upon 3-dimensional imaging and computerized tooth set-ups. Once an ideal tooth set-up is established, customized brackets can be constructed with built-in first and third order adjustments (e.g., labio-lingual, torsion), as well as tip or second order adjustments. This increases conformity and accuracy, and decreases treatment time and pain to the patient.

Figure 11:
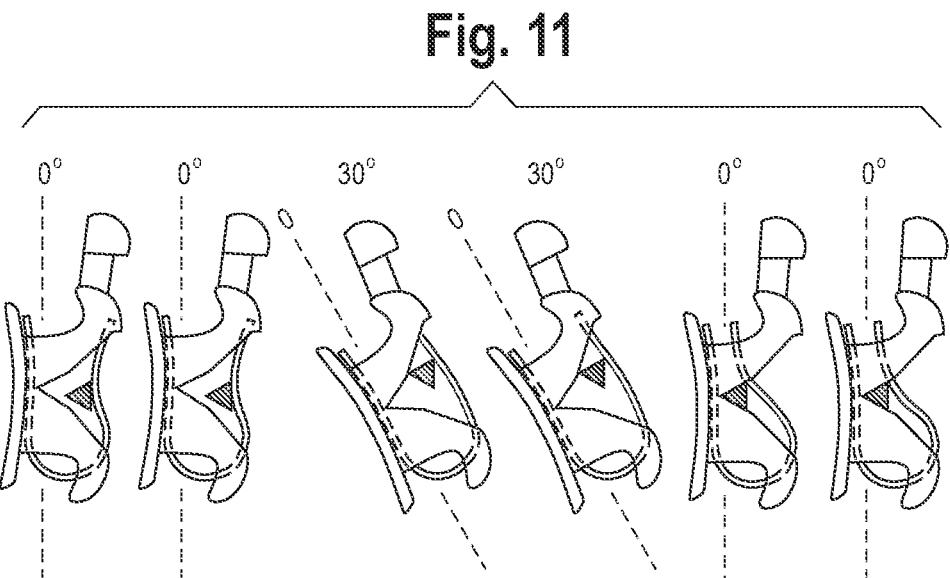
FIGS. 11 and 12 are side elevation views showing an application of the presently disclosed orthodontic system on several teeth to effect straightening of the third and fourth illustrated teeth.
Figure 12:
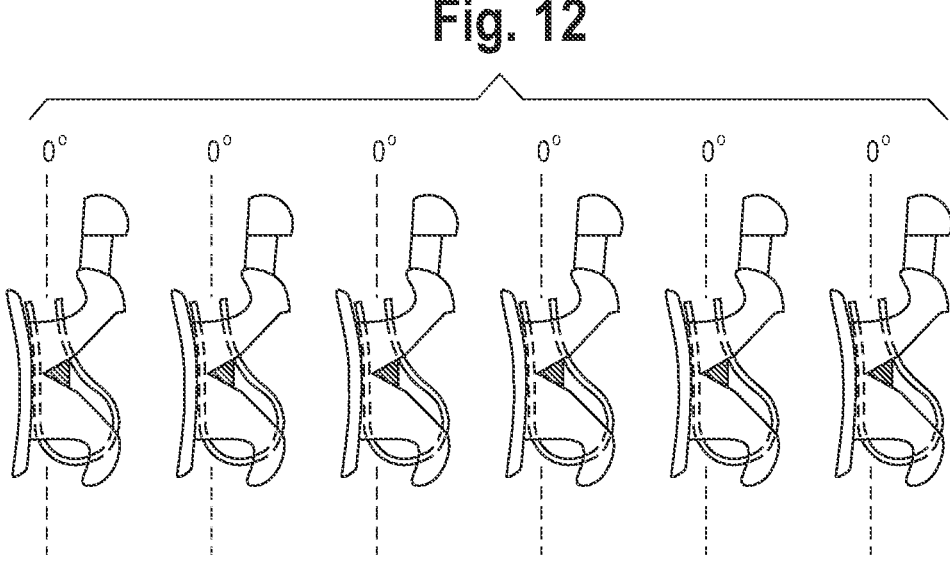

FIGS. 11 and 12 show an application of the presently disclosed orthodontic system on several teeth. FIG. 11 shows the degree from an ideal vertical in six mandibular anterior teeth (i.e. cuspid to cuspid). Since the bracket/clip force module flexes to accommodate the wire, the clip will deflect while the archwire maintains a passive, consistent torque. For example, there will be little or no torsional movement within the wire, even for teeth with 30 degrees of lingual crown torque (e.g., teeth 3 and 4). Instead, the clip will deflect, placing force on the wire to eventually engage fully within the triangular slot.

Since the archwire and bracket slot will continue to interact to force the apex to the wire due to the force from the clip, this movement will be continuous and gradual, and does not initially require the full engagement of the wire in the slot as is required in conventional systems.

However, since full engagement will eventually occur, the torque programmed into the system is the torque ultimately experienced by the teeth, shown in FIG. 12, as each tooth moves separately from another. By contrast, the conventional edgewise system requires full engagement of the archwire within the slot. This requirement ensures that the greatest amount of force experienced on the tooth is upon insertion of the wire. The high level of force is associated with pain and discomfort to the patient as well as an increased potential for root resorption and undermining resorption of the bone. In addition, the torsional readings of the six teeth will be well short of 0 degrees (i.e. 0, 4, 8, 8, 4 0) and will require torsional overcompensation to eventually reach the desired torque.

Figure 13:
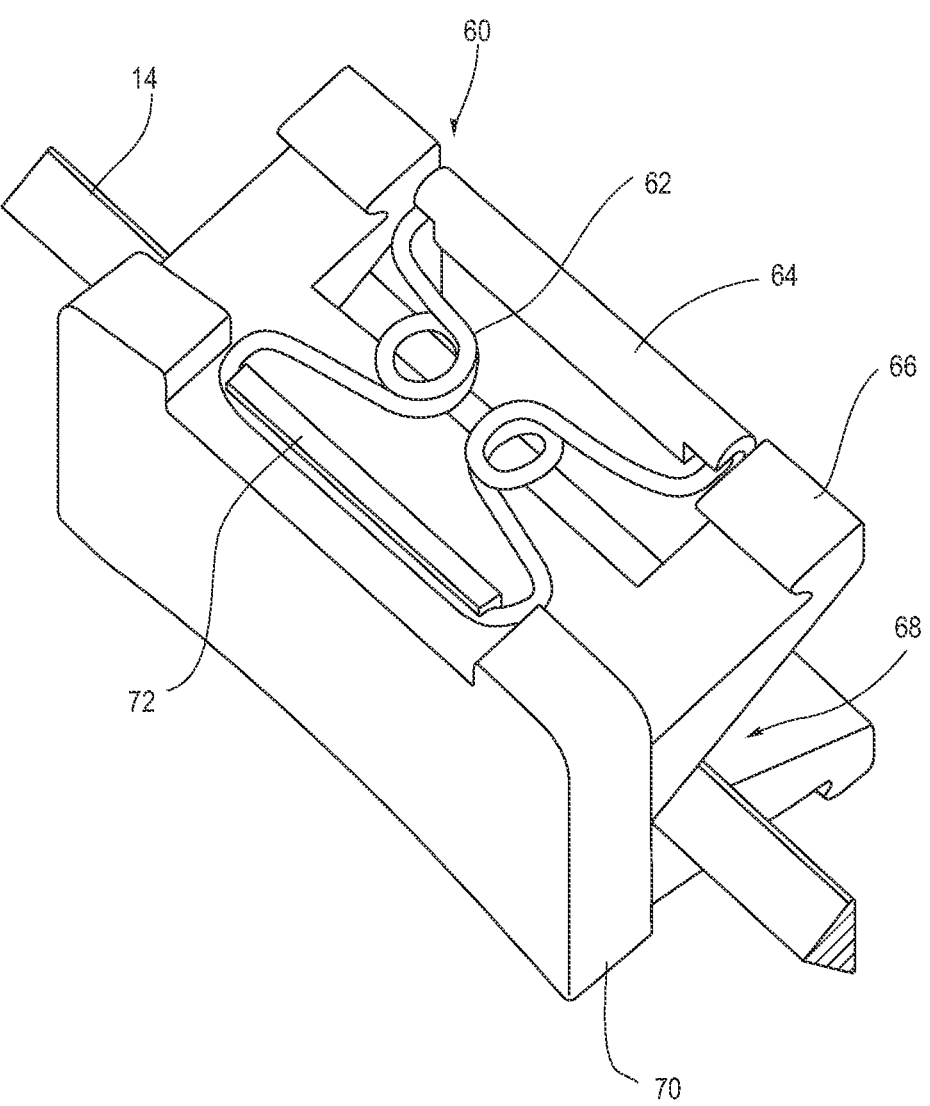
FIG. 13 is a perspective view showing a disclosed system illustrating a double helical loop design (e.g., with flexible Nickel-titanium plates) that can slide into a convex-configured slot, according to an embodiment of the present application.

FIG. 13 shows a system 60 illustrating a double helical loop design plate 62 (e.g., with flexible Nickel-titanium) that can slide into a convex-configured slot 72. Although illustrated as a double helical loop design, the plate 62 may have a single loop or other type of bent configuration, depending on the desired amount of tension, size constraints, etc. The plate 62 may be hinged to a clip 64 that can force the wire 14 toward a base 70. As shown, wings 66 are defined by a slope 68 with a consistent angle toward an apex. However, in other examples, the slope may have multiple angles, a sloped grade, or other suitable shape, consistent with this disclosure.

Tensioning devices, which in some embodiments may be O-rings or clips, apply the forces that create the movement, unlike every other conventional orthodontic appliance. O-rings may be formed from an elastomeric material suitable for attachment to the bracket by way of the bracket's attachment or ligating wings. The force placed upon the bracket and contained wire can be controlled by changes in the size (diameter) of the O-ring, the thickness of the material, and the composition of the material itself. However, presently available O-rings generally do not maintain a consistent force and must be periodically replaced.

Clips, on the other hand, can be made from materials that will not exhibit the same decaying properties of present elastomeric materials. For example, FIGS. 14 and 15 show a disclosed system nickel-titanium wire clip 74, interchangeable with any of the above systems. Tensioning devices, or clips, may be configured to be either inserted into a slot 72 at the base 78 of the bracket or attached to the ligating wings 76 or such other point of attachment added to the bracket as needed. Clips 74 may be formed of any material that will create a force consistent with what is needed to bring the three components of the force module together within the slot to draw the wire 14 and the apex together, such as nickel-titanium or other suitable memory wire. In general, any tensioning device effective to provide a compression force to bring the three components of the force module together within the slot may be employed.

FIGS. 16 through 18 show a system employing a magnetic pillow-style clip 82.

For example, the clip 82 includes a magnet 88 for engaging an oppositely-poled magnet 80 in the base 78 of the bracket. The clip 82 can include posts 84 to guide the clip 82 along the wings 76 as the attraction between magnets 80 and 88 draws the clip 82, and the wire 14, toward the base 78, as shown in FIG. 18.

The clip 82 shown in FIG. 17 includes a spring 86, such that the clip 82 can be extended to reach over one pair of wings 76 during placement. As shown in FIG. 19, a magnetic pillow-style clip 90 can be formed of an elastomeric material, so the body of the clip 90 stretches such that posts 90 reaches beyond the pair of wings.

FIGS. 20-23 show a system with helical springs 100 secured to a base 104. In this example, the spring 100 is secured to the base 104 on opposite sides with a clip 102 in between. Thus, the clip 102 spans a slot 106 through which a wire 14 extends. As shown in FIG. 21, the springs 100 may be secured to the base 104 by one or more fasteners 108, such as posts. The springs 100 force the wire 14 toward the base 104 by compression, until the wire 14 is seated in the apex, shown in FIG. 23. In some examples, the base is marked, scored, or otherwise treated to enhance adhesion to a surface of the teeth. As shown, the region 98 of the base 104 includes hatching that may hold adhesive and increase the surface area for such adhesion, thereby facilitating a solid bond between bracket and tooth.

Figure 24:
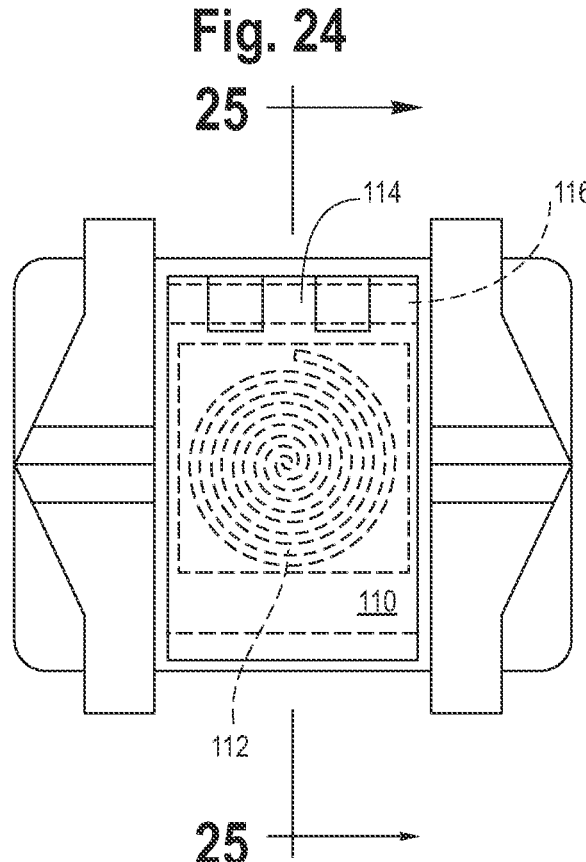
FIGS. 24-26 are views similar to FIGS. 20, 21, and 23, showing a disclosed system with a compression spring inside a hinged cap-style clip, according to an embodiment of the present application.
Figure 25:
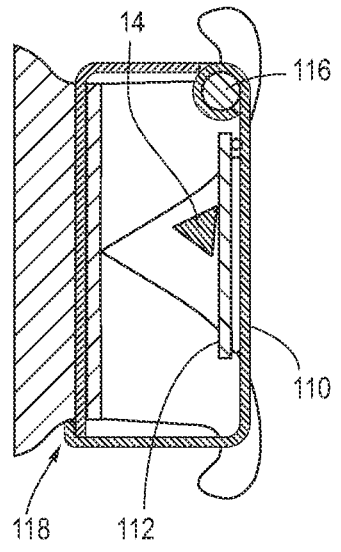
Figure 26:
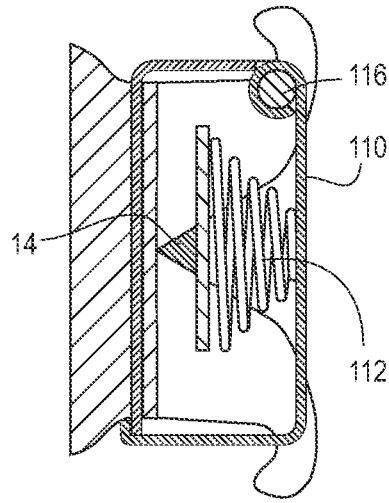

FIGS. 24-26 show a system with compression spring 112 inside a hinged cap-style clip 110. The clip 110 includes a hinge 114 that rotates about a pin 116 to allow for placement of the wire 14 within the slot. Once in place, the clip 110 is closed by a latch 118 situated near the base of the bracket. FIG. 25 shows a closed clip 110 where the spring 112 is compressed, exerting force against wire 14 toward the base. FIG. 26 shows the spring 112 expanded, forcing wire 14 to be seated in the apex.

Figure 27:
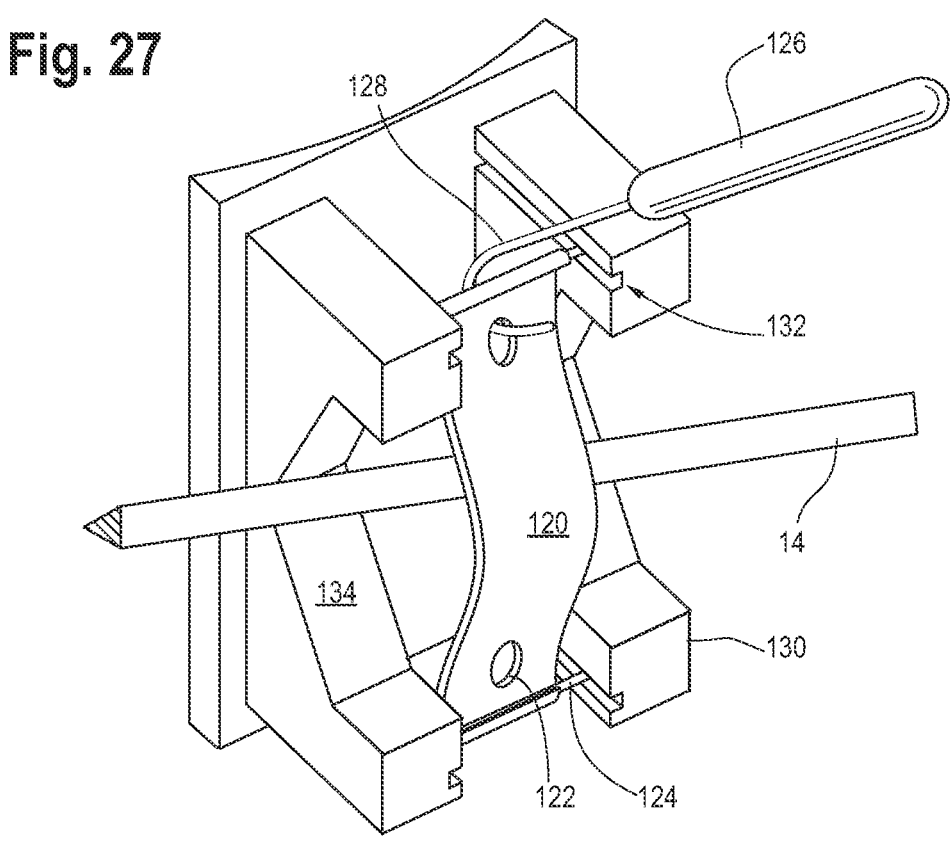
FIGS. 27 and 28 are perspective views showing a disclosed system with helical compression springs inside bracket wings with horizontal bars, according to an embodiment of the present application.
Figure 28:
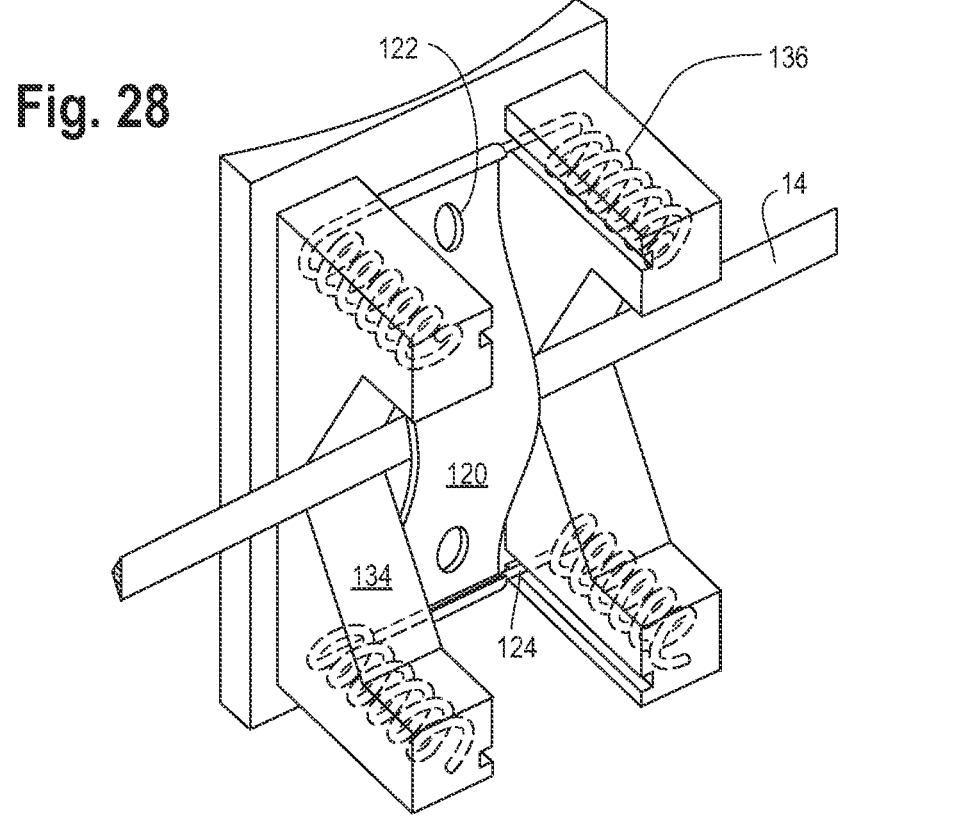

FIGS. 27 and 28 show a system with helical compression springs 136 internally positioned within the bracket wings 130. Opposing springs 136 are joined by horizontal bars 124 to which the clip 120 may attach. For example, a tool 126 may include a manipulator 128 to engage with an opening 122 of the clip 120. In this manner, the clip 120 can be mounted between bars 124 after placement of the wire 14. Once in place, the wire 14 is forced against sloped surface 134, as the springs 136 force the bars 124 and the attached clips 120 toward the base of the bracket guided by channels 132.

Figures 29, 30:
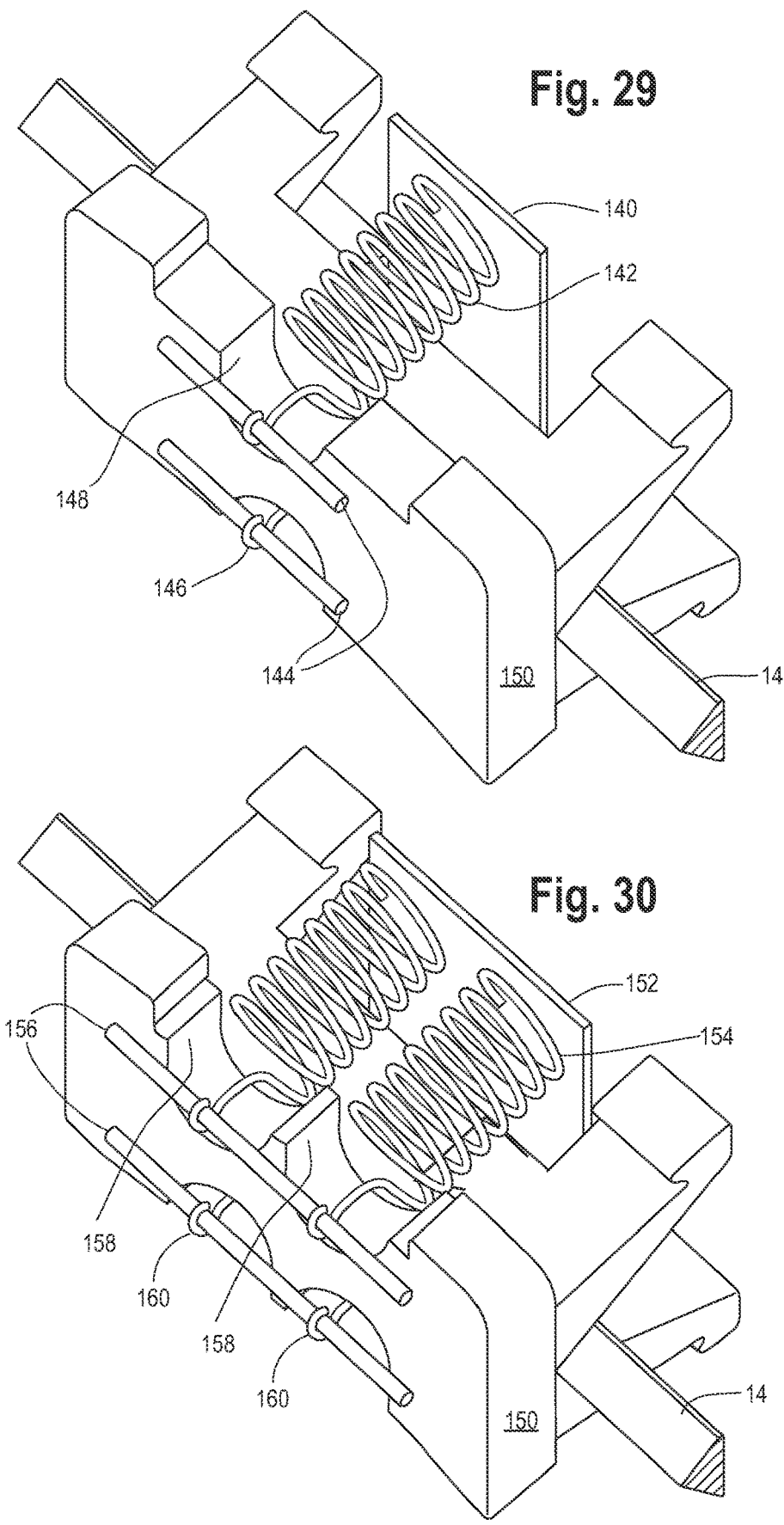
FIG. 29 is a perspective view of a disclosed system illustrating a single (per side) helical spring clip design with a T-bar clip, according to an embodiment of the present application.
FIG. 30 is a perspective view of a disclosed system illustrating a double (per side) helical spring clip design, according to an embodiment of the present application.

FIG. 29 shows a system illustrating a single (per side) helical spring clip design. As shown, a spring 142 is fixed (e.g., by welding, brazing, integrated manufacturing, etc.) to a clip 140 (e.g., a T-bar) on one or both sides of bracket base 150. In examples, the spring extends through the base 150 by a slot or void 148. On the opposite side of the base 150, a post(s) 144 can secure the spring to the base, such as by a hook 146, although other methods, such as adhesive, welding, soldering, tension fittings, clips, etc., are also considered based on a particular application. Although illustrated as resting on a generally planar surface of base 150, in some examples the surface of the base 150 may include hatching suitable to accommodate a post 144 and/or hook 146 (see, e.g., FIG. 21). In some examples, channels embedded in the base 150 such that, as the post(s) 144 and/or hook(s) 146 are set in place, they do not extend beyond the generally planar surface of the base 150. In some examples, the post(s) 144 are integrated with the base 150, such that the spring 142 can attach to the post(s) 144.

FIG. 30 shows a system illustrating a double (per side) helical spring clip design. As shown, springs 154 are fixed to a clip 152 (e.g., a T-bar) on one or both sides of bracket base 150. In examples, the spring extends through the base 150 by slots 158. On the opposite side of the base 150, posts 156 secure the springs 154 to the base, such as by a hook 160. FIG. 30 can similarly include hatching, channels, and/or integrated posts, such as described with respect to FIG. 29.

Figures 31, 32:
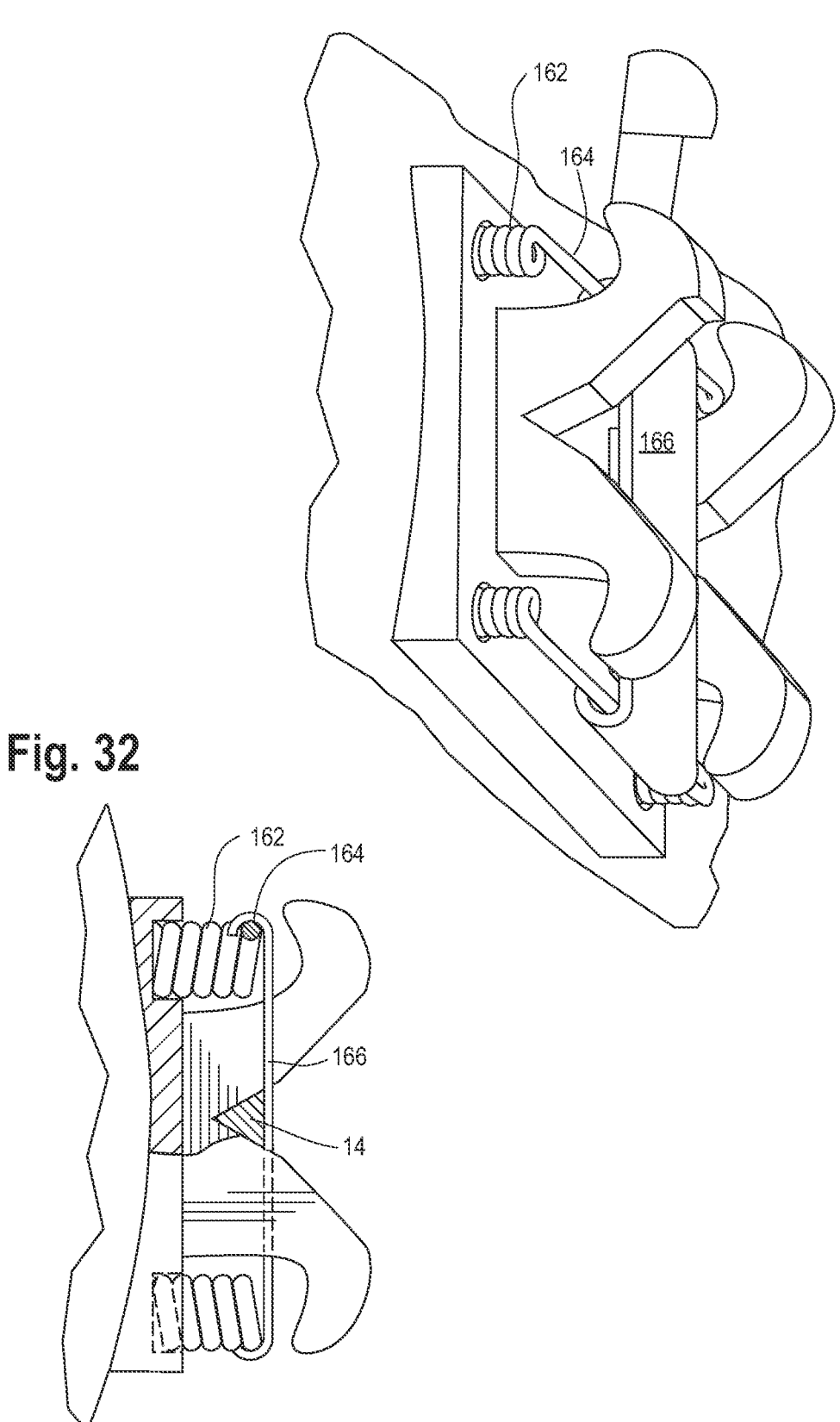
FIGS. 31 and 32 are a perspective view and a side elevation of a disclosed system illustrating helical springs embedded in the base of the bracket with an interconnecting bar, according to an embodiment of the present application.
Figure 36:
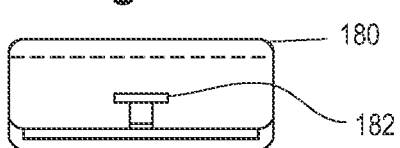
FIGS. 36-39 respectively show a top plan view, two rear elevations showing movement, and a side elevation view of the structure of FIG. 37, showing a lingual system with a second style of self-ligation, according to an embodiment of the present application.
Figure 37:
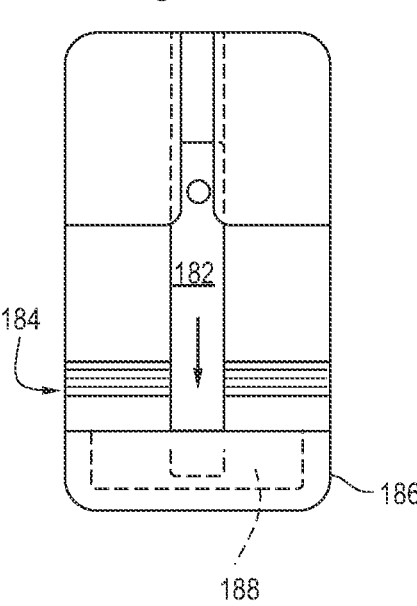
Figure 38:
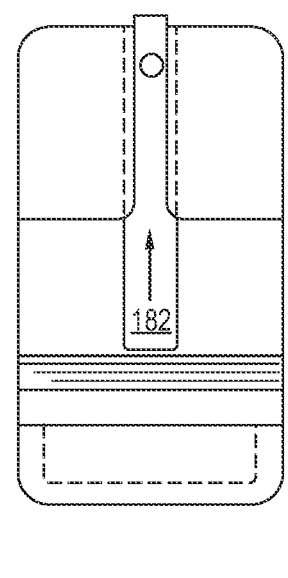
Figure 39:
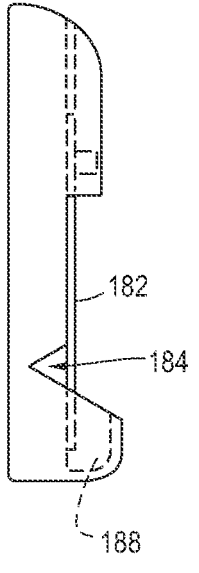

FIGS. 31 and 32 show a system illustrating helical springs 162 embedded in the base of the bracket with an interconnecting bar 164 that will allow effective movement of a clip 166 to draw the wire 14 and the bracket base toward one another.

For lingual applications, brackets will differ in that they will be reduced in bracket height and will incorporate either a rotational arm that will close over the slot, or a sliding arm that will close over the slot from a gingival to incisal direction.

FIGS. 33-35 show a lingual system with a first style of self-ligation. For example, a clip 168 is fixed to a bracket 170 by a pin 172 or other mechanism about which the clip 168 may pivot. As such, the clip 168 may pivot over a barrier 176 to reveal the slot 174 for wire placement, and then be returned to a central position to apply force to the wire within the slot.

Figure 40:
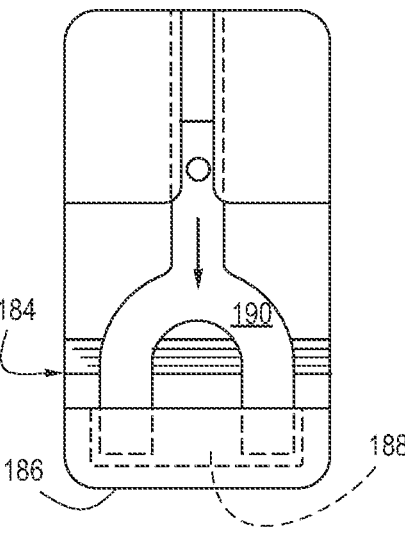
FIGS. 40 and 41 are views similar to FIGS. 37 and 38 of another embodiment of a lingual system, according to an embodiment of the present invention.
Figure 41:
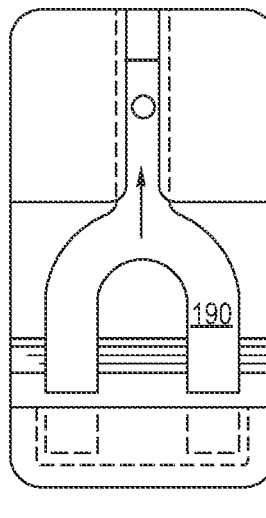

FIGS. 36-41 show a lingual system with another style of self-ligation. As shown, bracket 180 mates with a clip 182 which is configured to slide to reveal the slot 184 for wire placement. After placement of the wire, the clip 182 slides into a void 188 within a sheath 186 to protect the clip 182 and prevent unwanted contact with the patient's tongue, etc. FIGS. 40 and 41 show an alternative clip design 190 with an inverted "Y" shape. Thus, when in place the clip 190 would apply a force at two points of contact with a wire that extends through slot 184 for better rotational control.

Figure 42:
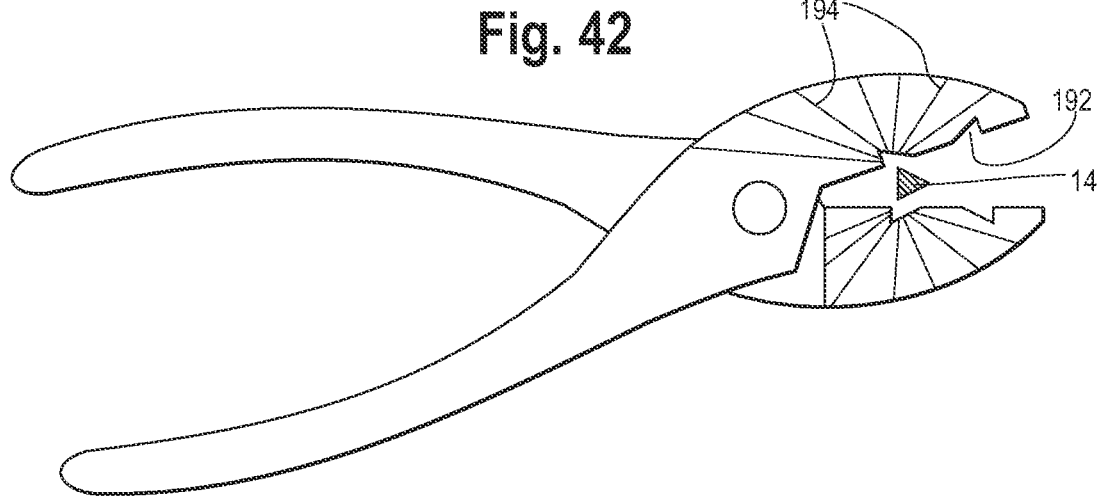
FIGS. 42 and 43 are plan views, respectively open and closed, showing a plier for making adjustments to a triangular archwire, according to an embodiment of the present application.
Figure 43:
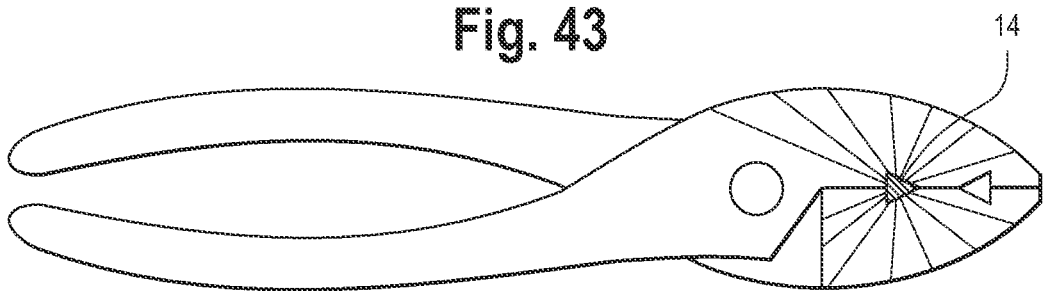

In addition to the appliance, also disclosed is a plier for adjustments of the archwire to properly guide the teeth into their correct position. FIGS. 42 and 43 show a design for a plier for making adjustments of the archwire. The plier may be designed with spacers 192 for a particular wire type (e.g., a triangular wire of one or more dimensions), and advantageously include protractor-style markings 194 on it to allow for better determination of torque control of the archwire.

FIGS. 44-46 show a molar tube design 200 with a C-type clip 212 to insure accurate labio-lingual positioning of the wire along the slope 204 in the apex of the slot. As shown, the bracket 208 includes a breakaway tab 206 that may include perforations, or may be otherwise manipulable (such as with a cutting tool, a roll-back tab, etc.) to allow for easy removal. The bracket 208 may also comprise an auxiliary slot 210 for auxiliary attachments as needed for additional torsional or rotational movements. This or similar designs can also be utilized for improved accuracy with the conventional appliances by using a rectangular slot instead of the triangular slot.

Practitioners using conventional edgewise appliances have, since the early 1980's, been trying to reduce the amount of adjustments in the wire needed during a treatment regime to adjust the teeth correctly. For a conventional edgewise appliance treatment, average torsional measurements, labio-lingual positions of the teeth relative to adjacent teeth, and angulation of the roots of the tooth have been included when determining the position of the wire receiving slot relative to the base of the bracket or tube. Adjustments placed in each individual bracket, based on averages developed as early as 1972 by Andrews, and modified by such individuals as Roth and McGlothlin, Bennet and Trevisi (MBT), have been used to align the teeth with minimal adjustments to the archwire, assuming the brackets are placed on the teeth in highly precise positions. However, because the wires of the conventional edgewise appliance engage the slot of the bracket with significant tolerance between the wire and slot, torque control in the conventional edgewise appliance may be expressed only as an average (see, e.g., FIG. 7).

Advantageously, the use of average tooth positions to determine the torque, angulation and labio-lingual position of the teeth is not needed in the disclosed system. Instead, the present disclosure provides a custom designed approach, which determines the force and adjustment for each tooth individually, and creates an application that employs a gradual, continuous force during treatment. For instance, the custom-adjusted appliance system may utilize computer assisted diagnostic imaging (e.g., 3-dimensional cone beam scans or the equivalent), computer-aided treatment plans, custom-built individual brackets and/or tubes configured to render results consistent with the computer-aided treatment plan, and laboratory-constructed indirect bonding trays with the embedded brackets placed ideally for transfer to the patient. The customizable features of the disclosed system therefore do not rely on average force determinations, as do conventional systems.

Practitioners employing the disclosed system may employ as few as one archwire (e.g., a triangular wire) for the entirety of the treatment (e.g., from start to finish), depending on the initial malocclusion. If torsional forces cause a significant increase in the labio-lingual height of the brackets or tubes, then robotically bent archwires could be constructed to work in this custom—built appliance that would compensate for the lack of torque adjustment that could be reasonably placed in the custom brackets.

The advantages of the disclosed system over conventional systems are numerous. For example, conventional systems (e.g., the Edgewise Appliance) require full engagement of the archwire within the bracket slot, whereby the force applied against the bracket is concentrated, yet can be felt by adjacent teeth, as illustrated in the example in FIG. 7.

By contrast, FIGS. 10 through 12 show spacing detail from an application of the presently disclosed orthodontic system on several teeth. As shown, the disclosed system independently applies a gradual, continuous force against each bracket, which results in movement in all three planes until the archwire becomes fully seated within the apex of the bracket slot.

Furthermore, unwanted and uncontrolled torsional movements on adjacent teeth, which are unavoidable in conventional edgewise appliances, are eliminated in the disclosed system because an independently working force module moves each tooth. Torque placed in the wire may eventually be fully applied at the respective bracket of the disclosed system when the archwire moves into the apex.

Due to the diverging line angles in the disclosed system, minimal friction is seen in the disclosed system. Couples created by the parallel line angles within the conventional edgewise bracket slot are required for control of tooth movement, but introduce unavoidable binding and friction when opening and closing spaces. Coupling that causes binding and friction, which is unavoidable in the conventional edgewise system, may be eliminated. Advantageously, such coupling is eliminated in the disclosed system.

Due to the improvements of the disclosed system over conventional designs, fewer or no archwire changes are needed to complete the treatment. Thus, the disclosed system may reduce the number of practitioner adjustments needed to complete the treatment.

Due to lighter, continuous forces generated by the disclosed system, treatment for the patient is gentler and more comfortable. Similarly, the disclosed system may cause fewer iatrogenic problems since heavy intermittent forces are reduced or eliminated. Further, the force module in the disclosed system acts as a built-in shock-absorbing system. As biting pressures are placed on each tooth the force module unit can flex and allow a more biological response to the biting forces. Such a flexible, biologically compatible movement cannot be achieved in the conventional edgewise system.

In examples, mechanical attributes of the disclosed system can provide benefits over conventional systems. For instance, teeth are moved primarily by individual force modules rather than the force/deflection characteristics of an archwire, an attribute not before realized in a fixed orthodontic appliance.

Unintended movement of adjacent teeth is reduced or eliminated in the disclosed system due to the individual tooth modules. Unintended movement occurs as standard procedure in all conventional edgewise systems and is the reason anchorage values in Edgewise Appliance treatment are so critical. For example, in conventional edgewise systems, placing a torsional movement in the wire (i.e. twisting the wire axially) to move a single tooth will adversely move the teeth adjacent to the intended tooth and is unavoidable.

Advantageously, there is gradual, continuous movement between the archwire and the presently disclosed bracket. By contrast, the force interaction between the archwire and the conventional edgewise bracket is focused and rigid. Research shows that more movement occurs per adjustment in the disclosed bracket compared to the conventional edgewise system due to the precise nature of the wire-bracket slot interaction.

Research shows that the rate of movement in the disclosed system is more gradual and more consistent than in the conventional edgewise system. For example, friction is virtually eliminated due to the diverging line angles of the slot design. There is no mechanism in the disclosed design to create a mechanical couple that will restrict movement along the long axis of the wire during space opening or closing. By contrast, coupling established within the parallel line angles of the conventional edgewise appliance slot are the fundamental elements of tooth control for the conventional edgewise system. Friction is necessary for conventional edgewise orthodontics to control the positions of teeth, but is a problem when sliding mechanics are needed for opening or closing space or unraveling crowded teeth.

By employing the disclosed system, quantifiable and controllable forces can now be placed on individual teeth, if desired. For example, since the deflection of an archwire is not needed to move the teeth in the disclosed system, the measurable force/deflection characteristics of the tensioning device used on each tooth can be easily and individually controlled.

By contrast, the conventional edgewise system relies on a complex system of forces that include anchorage values of individual teeth and the highly variable force/deflection values of the archwire that is different at any point on its length. Due to that variability, it has been analytically impossible to calculate the force levels on any particular tooth within the conventional edgewise system. In effect, the orthodontist has always placed forces on the teeth by "feel" and the ability of the wire to engage the wire into the slot without creating a permanent deformation of the wire.

Due to the gradual movement of the bracket apex toward the archwire, the amount of movement within the disclosed system is self-limiting. By contrast, other forms of fixed appliances can utilize auxiliary torquing springs that continue to move teeth and require constant monitoring to prevent more movement than is desired.

Additionally, numerous physiological benefits are enjoyed by an orthodontic patient fitted with the presently disclosed system. For example, the disclosed system is designed for patient comfort and biological compatibility. The "cycle of pain" associated with the heavy, intermittent forces placed at each appointment in the conventional edgewise system has been replaced with light, continuous forces that abundant research has shown to be the most biologically desirable and physiologically compatible force for moving teeth. The disclosed system does exactly that, as it is designed to provide light, continuous forces in all three planes of space (see, e.g., FIG. 11).

The ability of the archwire to slide within the bracket slot of the disclosed system provides a built-in shock absorption system that allows the periodontium to function in a more normal fashion. The periodontium (i.e. supporting structures of the teeth-bone, periodontal ligament) offers a system of support to the teeth that will adjust to the pressures placed on individual teeth or groups of teeth during function. This vital function is greatly inhibited when full-dimension rectangular archwires are placed in the conventional edgewise system as the wire is locked into all of the brackets and interferes with the ability of the periodontium to function properly. There is little or no vertical flexibility in the conventional edgewise system. By contrast, the disclosed system will allow these minute flexing movements to occur without allowing the position of the tooth to change.

Because the disclosed system permits the teeth to function more normally during treatment, the practitioner may expect a reduction in the amount of iatrogenic damage to the teeth (such as, for example, undermining bone resorption and root shortening) using the disclosed system. Such damage is an ordinary consequence of the intermittent application of heavy forces for long periods of time typical of using the conventional edgewise system.

Moreover, studies have shown that the level of discomfort following an adjustment appointment is less for the disclosed system than the conventional edgewise system.

The orthodontic practitioner realizes unique benefits that stem from the presently disclosed system and its use as well. For example, leveling, aligning and torque control of the teeth can be done with one wire in the disclosed system. By comparison, at least three, and most often many more, are required for use with the conventional edgewise system. Further, since each wire change requires an office visit, fewer office visits, just for the leveling and aligning phase of treatment, will be required for the disclosed system. This could be three to six fewer appointments required for both the office and patient to manage just in the initial phases of treatment.

Additionally, the disclosed system is an ideal appliance for patients traveling long distances, due to fewer appointments, continuous movement until all desired movement is expressed, and is self-limiting.

Brackets can be constructed of a variety of materials that are not designed to withstand the heavy, torsional forces the conventional edgewise appliance frequently applies to the bracket slot. For example, transparent and/or lighter materials can be used, providing aesthetic and other benefits to the patient. Moreover, bracket breakage is a problem in conventional edgewise systems with some materials. This is not a problem with the disclosed design since the wire does not engage the bracket with heavy, focused forces sufficient to cause breakage, which is a common issue with the conventional edgewise appliance.

Treatment philosophy and protocol do not need to change for the practitioners. Wire sequences can still be employed for those looking for a "cookbook" approach for their assistant's ease of use. In any event, all the attributes of the disclosed system will combine to reduce chair time for the practitioner by half, or perhaps, more. The process of ligating the archwires also becomes much easier since the wire is not required to fully engage with the bracket slot, such that the patient does not experience the immediate discomfort from initial full engagement.

Consistent with the facility with which the improved disclosed system is created, manufacturing techniques for such a design are similarly improved. For instance, the disclosed system can employ tooth imaging options (e.g., three-dimensional cone-beam or intra-oral scans, etc.) to generate customizable brackets that will be produced for each tooth based on pre-determined final positions of the teeth. These custom brackets with slot positions placed in each bracket according to their final position will be transferred to the doctor through indirect bonding trays produced by a dedicated lab so that accurate placement of the brackets can occur. Pre-formed wires may accompany the bracket placement bonding trays and may be produced by employing robotic wire bending based on the previously mentioned imaging.

I claim:

1. A system for moving a first tooth in a patient's mouth, the system comprising:

a bracket having a surface configured to be mounted to a first tooth and a pair of wings defining a slot having oppositely disposed first and second surfaces that converge at an apex, a wire running through the slot at a distance from the apex, and a tensioning device comprising a cap operatively attached to one or more springs, the cap configured to provide a force against the wire and through the bracket pressing the first surface of the slot toward the wire;

wherein the system is configured so that the tensioning device gradually moves the apex of the slot toward the wire.

2. The system of claim 1, wherein the tensioning device is attached to the bracket.

3. The system of claim 1, wherein the one or more springs are positioned in the cap, in the bracket, or both.

4. The system of claim 1, wherein the magnitude, direction, or both of the force pressing the first surface of the slot toward the wire is adjustable.

5. The system of claim 1, wherein the system is configured so that the system is capable of responding to an external pressure placed on the first tooth by changing the magnitude, direction, or both of the force pressing the first surface of the slot toward the wire, configured such that an external pressure placed on the first tooth having a certain magnitude and direction reduces the magnitude of the force pressing the first surface of the slot toward the wire.

6. A method for moving a first tooth in a patient's mouth, the method comprising:

mounting a bracket to the first tooth, the bracket comprising a slot having oppositely disposed first and second surfaces that converge at an apex;

placing a wire within the slot; and bringing a tensioning device into contact with the wire so as to provide a force through the tensioning device and the bracket, the force through the bracket pressing the first surface of the slot toward the wire at a distance from the apex, thereby imparting a force on the first tooth;

wherein the tensioning device is a cap-style clip that gradually moves the bracket such that the apex of the slot moves toward the wire.

7. The method of claim 6, wherein the magnitude, direction, or both of the force on the first tooth is independent from forces placed on adjacent teeth.

8. The method of claim 6, wherein the wire is positioned within the slot so that the tensioning device presses a first portion of the wire against the first surface of the slot and a second portion of the wire against the second surface of the slot.

9. The method of claim 6, wherein the tensioning device comprises a magnetically-operated cap arranged opposite a base of the bracket.

10. The method of claim 9, wherein the tensioning device comprises a magnet positioned in the bracket.

11. The method of claim 9, wherein the tensioning device comprises a magnet positioned in the cap.

12. The method of claim 6, further comprising adjusting the amount of force by which the tensioning device presses the first surface of the slot toward the wire.

13. The method of claim 12, wherein adjusting the amount of force by which the tensioning device presses the first surface of the slot toward the wire comprises tuning the tensioning device, wherein adjusting the magnitude, direction, or both of the force by which the tensioning device presses the first surface of the slot toward the wire comprises replacing a first tensioning device with a second tensioning device.

14. The method of claim 12, wherein the tensioning device temporarily moves the apex of the slot away from the wire in response to an external pressure placed on the first tooth.

15. The method of claim 6, wherein the magnitude of the force imparted on the first surface of the slot toward the wire is reduced in response to an external pressure placed on the first tooth.

16. The system of claim 1, wherein the bracket or the tensioning device is formed of a resin material.

\* \* \* \* \*